(12) United States Patent
Kondo et al.

(10) Patent No.: US 7,369,708 B2
(45) Date of Patent: May 6, 2008

(54) IMAGE DATA COMPRESSION DEVICE AND ENCODER

(75) Inventors: Yoshimasa Kondo, Matsumoto (JP); Kyoichi Osada, Kofu (JP)

(73) Assignee: Seiko Epson Corporation, Tokyo (JP)

( * ) Notice: Subject to any disclaimer, the term of this patent is extended or adjusted under 35 U.S.C. 154(b) by 735 days.

(21) Appl. No.: 10/981,674

(22) Filed: Nov. 5, 2004

(65) Prior Publication Data
US 2005/0123049 A1 Jun. 9, 2005

(30) Foreign Application Priority Data
Nov. 20, 2003 (JP) ............................. 2003-391088

(51) Int. Cl.
G06K 9/36 (2006.01)
G06K 9/46 (2006.01)
(52) U.S. Cl. ................... 382/239; 382/251; 382/250
(58) Field of Classification Search ................ 382/239, 382/251, 248, 250, 236; 375/240.03, 240.2
See application file for complete search history.

(56) References Cited

U.S. PATENT DOCUMENTS 5,253,078 A * 10/1993 Balkanski et al. ........... 382/250
5,760,836 A * 6/1998 Greenfield et al. ..... 375/240.05
5,963,673 A * 10/1999 Kodama et al. ............. 382/239

FOREIGN PATENT DOCUMENTS

| JP | A 07-023385 | 1/1995 |
| JP | A 11-122623 | 4/1999 |
| JP | A 2001-008215 | 1/2001 |
| JP | A 2001-025016 | 1/2001 |

OTHER PUBLICATIONS

Okubo, T., et al.; (1997); "A Hardward/Software Co-design for Real-Time MPEG2 LSIs"; NTT R&D, col. 46, No. 6; pp. 609-614.
U.S. Appl. No. 10/981,725, filed Nov. 5, 2004, Kondo et al.
U.S. Appl. No. 10/851,334, filed May 24, 2004, Kondo et al.
U.S. Appl. No. 10/847,612, filed May 18, 2004, Kondo et al.
U.S. Appl. No. 10/981,690, filed Nov. 5, 2004, Kondo et al.
U.S. Appl. No. 10/981,633, filed Nov. 5, 2004, Kondo et al.
Annex L, "Rate Control," ISO/IEC 14496-2; 1999(E), pp. 311-321.

* cited by examiner

*Primary Examiner*—Phuoc Tran
(74) *Attorney, Agent, or Firm*—Oliff & Berridge, PLC

(57) ABSTRACT

An image data compression device including: a quantization section which quantizes image data; a FIFO buffer section which buffers quantized data for N frames (N is an integer greater than one) from the quantization section; an encoded data generation section which reads the quantized data from the FIFO buffer section asynchronously from writing into the FIFO buffer section, and generates encoded data; and a rate control section which changes a quantization step of the quantization section by using the data size of the encoded data. The rate control section calculates a quantization parameter to be equal to or less than an upper threshold of the quantization parameter or to be equal to or greater than a lower threshold of the quantization parameter by using an average data size of the encoded data for preceding N frames.

25 Claims, 24 Drawing Sheets

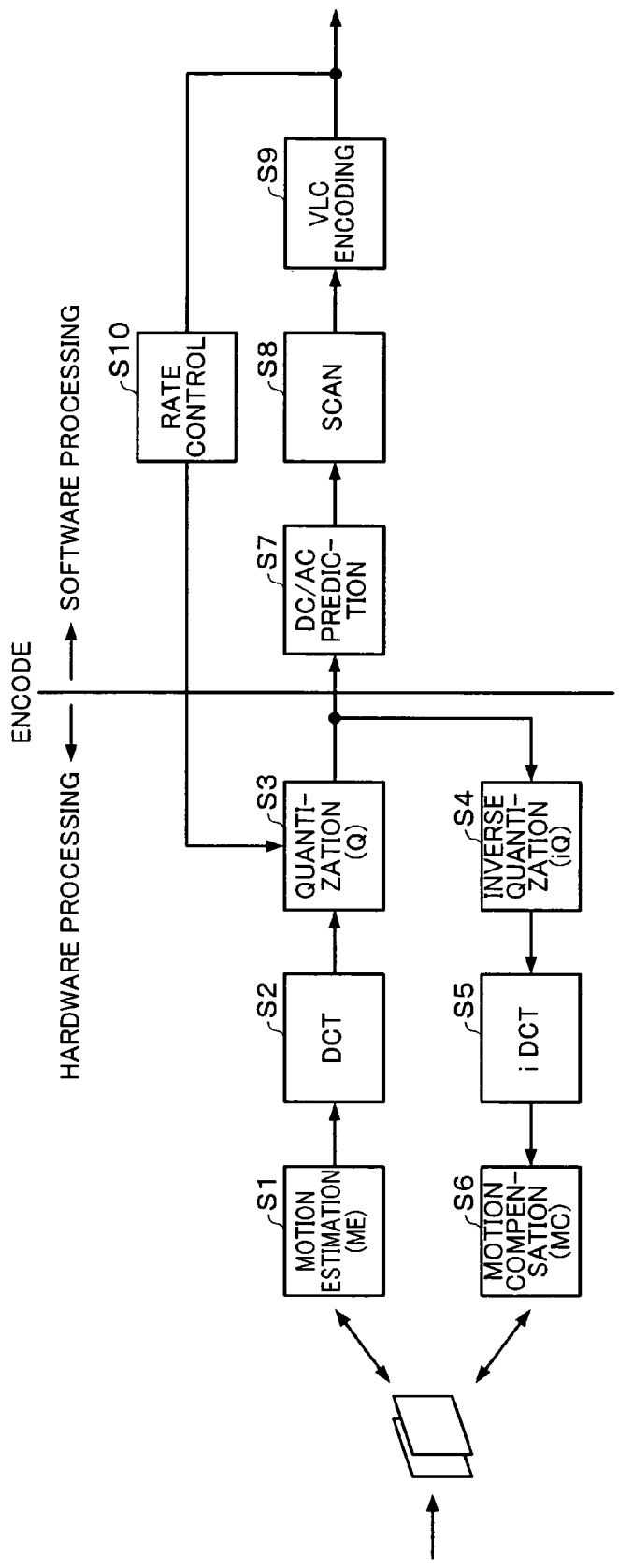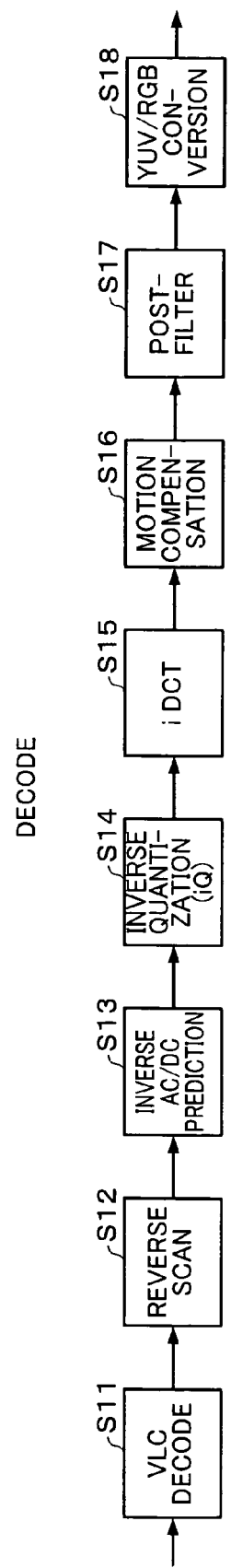
FIG. 1A
FIG. 1B

FIG. 3

DCT COEFFICIENT

HIGHER FREQUENCY →

HIGHER FREQUENCY ↓

| 224 | 130 | 40  | 16  | 11 | 8  | -2 | -1 |
|-----|-----|-----|-----|----|----|----|----|
| 41  | -34 | -14 | -10 | -4 | 0  | -1 | 3  |
| -7  | 10  | -12 | 2   | 2  | -5 | 1  | -1 |
| 22  | -7  | 9   | 2   | 0  | 0  | -3 | 2  |
| -8  | 4   | -6  | 3   | -1 | -2 | 4  | -1 |
| 5   | 2   | -1  | -4  | 0  | 1  | -1 | -1 |
| 4   | -5  | 3   | -1  | 0  | 2  | 0  | -1 |
| -5  | 5   | -2  | 3   | 0  | -2 | 1  | -1 |

FIG. 4

QUANTIZATION TABLE

| 8 | 6 | 5 | 8 | 12 | 20 | 26 | 30 |
|---|---|---|---|---|---|---|---|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

FIG. 5

QUANTIZED DCT COEFFICIENT

| 28 | 22 | 8  | 2  | 1 | 0 | 0 | 0 |
|----|----|----|----|---|---|---|---|
| 7  | -6 | -2 | -1 | 0 | 0 | 0 | 0 |
| -1 | 1  | -2 | 0  | 0 | 0 | 0 | 0 |
| 3  | -1 | 1  | 0  | 0 | 0 | 0 | 0 |
| -1 | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |

FIG. 6

$$R = X_1 Ec \frac{1}{Qc} + X_2 Ec \frac{1}{Qc^2}$$

$$Ec = \begin{cases} \sum \frac{|x'_{ij}|}{A} & \text{(INTER-FRAME-CODED MACROBLOCK)} \\ \sum \frac{|x_{ij} - \mu|}{A} & \text{(INTRA-FRAME-CODED MACROBLOCK)} \end{cases}$$

$$(\mu = \sum \frac{|x_{ij}|}{A})$$

FIG. 14

| VARIABLE | DEFINITION |
|---|---|
| Rs | BIT RATE |
| Rc | NUMBER OF BITS USED FOR ENCODING IN CURRENT FRAME |
| Rp | AVERAGE NUMBER OF BITS GENERATED PER FRAME |
| Ec | AVERAGE ABSOLUTE VALUE OF DATA IN CURRENT FRAME |
| Qc | QUANTIZATION PARAMETER IN CURRENT FRAME |
| Qp | QUANTIZATION PARAMETER IN PREVIOUS FRAME |
| Nr | NUMBER OF REMAINING ENCODING FRAME |
| Rr | REMAINING AVAILABLE NUMBER OF BITS |
| T | NUMBER OF BITS ASSIGNED TO CURRENT FRAME |
| S | NUMBER OF BITS USED IN PREVIOUS FRAME |
| Hp | NUMBER OF BITS OF INFORMATION OTHER THAN INFORMATION SUCH AS HEADER OR MOTION VECTOR AMONG NUMBER OF BITS USED IN PREVIOUS FRAME |
| Bs | NUMBER OF BITS OF FIFO BUFFER SECTION |
| B | NUMBER OF CURRENTLY OCCUPIED BITS OF FIFO BUFFER SECTION |

IMAGE DATA COMPRESSION DEVICE AND ENCODER

Japanese Patent Application No. 2003-391088, filed on Nov. 20, 2003, is hereby incorporated by reference in its entirety.

BACKGROUND OF THE INVENTION

The present invention relates to an image data compression device and an encoder.

Moving Picture Experts Group Phase 4 (MPEG-4) has been standardized as a general-purpose coding method for multimedia information such as image data of a still image or a moving image and sound data. A recent portable instrument implements encoding and decoding of image data conforming to the MPEG-4 standard, and can perform moving image reproduction and transmission/reception through a network.

In the MPEG-4 standard, compressed data obtained by encoding image data of a moving image must be generated at a constant rate. However, when compressing image data of a moving image, compression efficiency changes to a large extent depending on the type of image data. MPEG-4 Visual Part (Recommendation ISO/IEC 14496-2: 1999 (E) Annex L) describes a rate control for generating compressed data at a constant rate by controlling the amount of code to be generated so that such a change is within a predetermined range.

When performing MPEG-4 encode (compression) processing, a series of processing may be entirely performed by hardware. However, since this increases the circuit scale, it is difficult to achieve a reduction of size when integrating the circuits in an IC (semiconductor device or integrated circuit). In particular, a portable instrument such as a portable telephone cannot satisfy a demand for a reduction of the size of the instrument.

A series of encode processing may be entirely performed by using software. However, this increases the load imposed on a central processing unit (CPU) which processes the software. Therefore, the time necessary for the CPU to perform another processing is limited, whereby the performance of an instrument provided with the CPU is decreased. Moreover, the processing time of the CPU is increased, whereby power consumption is increased. In particular, a portable instrument such as a portable telephone cannot satisfy a demand for a reduction of power consumption in order to maintain battery life.

Therefore, a series of encode processing may be allocated between hardware and software. However, as a result of studies conducted by the inventors of the present invention, it was found that the rate control method disclosed in MPEG-4 Visual Part (Recommendation ISO/IEC 14496-2: 1999 (E) Annex L) cannot be performed when optimizing the allocation between hardware and software for a series of encode processing. Therefore, optimization of allocation of image data compression processing between hardware and software and generation of compressed data at a constant rate cannot be implemented together.

Moreover, according to the rate control described in MPEG-4 Visual Part (Recommendation ISO/IEC 14496-2: 1999 (E) Annex L), even if the generation rate of compressed data can be controlled, block noise is generally displayed in the image generated by decompressing the compressed data, whereby the display quality may deteriorate.

BRIEF SUMMARY OF THE INVENTION

According to a first aspect of the present invention, there is provided an image data compression device used to compress image data, the image data compression device comprising:

a quantization section which quantizes image data in frame units;

a FIFO buffer section which buffers quantized data for at least N frames (N is an integer greater than one) from the quantization section;

an encoded data generation section which reads the quantized data from the FIFO buffer section asynchronously from writing into the FIFO buffer section, and generates encoded data by encoding the quantized data; and a rate control section which changes a quantization step of the quantization section by using the data size of the encoded data to change a data size of encoded data to be processed, wherein the rate control section calculates a quantization parameter to be equal to or less than an upper threshold of the quantization parameter or to be equal to or greater than a lower threshold of the quantization parameter by using an average data size obtained by averaging the data size of the encoded data for N frames preceding a frame of image data to be quantized by the quantization section; and wherein the rate control section changes the quantization step based on the quantization parameter.

According to a second aspect of the present invention, there is provided an image data compression device used to compress image data, the image data compression device comprising:

a quantization section which quantizes image data in frame units;

a FIFO buffer section which buffers quantized data for a plurality of frames from the quantization section;

an encoded data generation section which reads the quantized data from the FIFO buffer section asynchronously from writing into the FIFO buffer section, and generates encoded data by encoding the quantized data; and a rate control section which changes a quantization step of the quantization section by using the data size of the encoded data to change a data size of encoded data to be processed, wherein the rate control section calculates a quantization parameter to be equal to or less than an upper threshold of the quantization parameter or to be equal to or greater than a lower threshold of the quantization parameter, and changes the quantization step based on the quantization parameter.

According to a third aspect of the present invention, there is provided an encoder which performs compression processing for image data, the encoder comprising:

an image input interface which performs interface processing for inputting image data;

a quantization section which quantizes image data in frame units;

a FIFO buffer section which buffers quantized data for at least N frames (N is an integer greater than one) from the quantization section; and a host interface which performs interface processing for a host which reads the quantized data stored in the FIFO buffer section asynchronously from writing into the FIFO buffer section, wherein the host calculates a quantization parameter to be equal to or less than an upper threshold of the quantization parameter or to be equal to or greater than a lower threshold of the quantization parameter by using an average data size obtained by averaging the data size of the encoded data for N frames preceding a frame of image data to be quantized by the quantization section; and wherein the quantization section quantizes image data by using a quantization step which is based on the quantization parameter.

According to a fourth aspect of the present invention, there is provided an encoder which performs compression processing for image data, the encoder comprising:

an image input interface which performs interface processing for inputting image data;

a quantization section which quantizes image data in frame units;

a FIFO buffer section which buffers quantized data for a plurality of frames from the quantization section; and a host interface which performs interface processing for a host which reads the quantized data stored in the FIFO buffer section asynchronously from writing into the FIFO buffer section, wherein the host calculates a quantization parameter to be equal to or less than an upper threshold of the quantization parameter or to be equal to or greater than a lower threshold of the quantization parameter; and wherein the quantization section quantizes image data by using a quantization step which is based on the quantization parameter.

BRIEF DESCRIPTION OF THE SEVERAL VIEWS OF THE DRAWING

FIGS. 1A and 1B are diagrams showing MPEG-4 encode processing and decode processing.

FIG. 3 shows an example of DCT coefficients.

FIG. 4 shows an example of a quantization table.

FIG. 5 shows an example of quantized DCT coefficients.

FIG. 6 shows model equation used in rate control

FIG. 14 is a table illustrative of variables used in calculation processing of a quantization parameter.

DETAILED DESCRIPTION OF THE EMBODIMENTS

Figure 2:
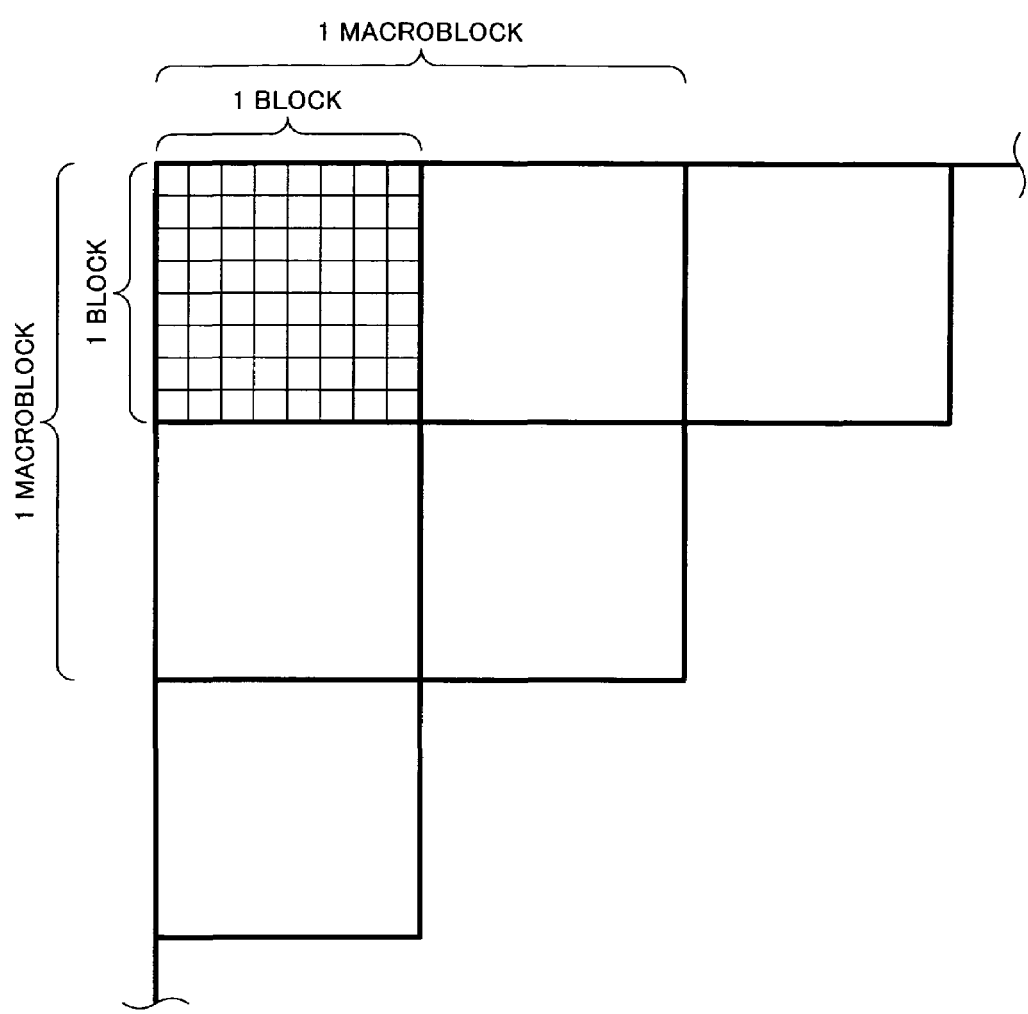
FIG. 2 is a diagram illustrative of a macroblock.

The following embodiments have been achieved in view of the above-described technical problems, and can provide an image data compression device and an encoder which can achieve both optimization of allocation of compression processing of image data between hardware and software and generation of compressed data at a constant rate, and can prevent deterioration of display quality.

According to one embodiment of the present invention, there is provided an image data compression device used to compress image data, the image data compression device comprising:

a quantization section which quantizes image data in frame units;

a FIFO buffer section which buffers quantized data for at least N frames (N is an integer greater than one) from the quantization section;

an encoded data generation section which reads the quantized data from the FIFO buffer section asynchronously from writing into the FIFO buffer section, and generates encoded data by encoding the quantized data; and a rate control section which changes a quantization step of the quantization section by using the data size of the encoded data to change a data size of encoded data to be processed, wherein the rate control section calculates a quantization parameter to be equal to or less than an upper threshold of the quantization parameter or to be equal to or greater than a lower threshold of the quantization parameter by using an average data size obtained by averaging the data size of the encoded data for N frames preceding a frame of image data to be quantized by the quantization section; and wherein the rate control section changes the quantization step based on the quantization parameter.

In this embodiment, the FIFO buffer section is provided between the quantization section and the encoded data generation section. This enables the processing of the quantization section and the processing of the encoded data generation section to be performed asynchronously and in parallel. When controlling the generation rate of the encoded data by the encoded data generation section, the rate control section changes the quantization step by using the average data size calculated by averaging the data sizes of the encoded data for a plurality of frames before the frame of the image data to be quantized by the quantization section.

Therefore, since the processing of the quantization section and the processing of the encoded data generation section are performed asynchronously, the generation rate of encoded data can be controlled even if the rate control disclosed in MPEG-4 Visual Part (Recommendation ISO/IEC 14496-2: 1999 (E) Annex L) cannot be performed, enabling generation of encoded data by compressing image data at a constant rate.

As described, the rate control section calculates the quantization parameter to be equal to or less than the upper threshold. Generally, if the quantization parameter is increased, the image data is thinned out to a greater extent and the size of the quantized data is reduced, whereby the size of encoded data can be reduced. However, block noise significantly occurs in an image generated by decoding this encoded data. Therefore, a problem in which block noise significantly occurs in an image obtained by decoding encoded compressed data can be prevented, even if the rate control is performed as described above.

The rate control section also calculates the quantization parameter to be equal to or greater than the lower threshold. Generally, if the quantization parameter is decreased, the amount of thinning out of image data is decreased, whereby the size of the quantized data is increased. However, frequency of occurrence of block noise is reduced in an image generated by decoding this encoded data. Therefore, the data size is not uselessly increased even if the rate control is performed as described above.

In this image data compression device, when the quantized data read from the FIFO buffer section is data of an intra-frame-coded macroblock which is encoded within one frame, the rate control section may calculate the data size of the encoded data as the average data size.

If the processing of the quantization section and the processing of the encoded data generation section are performed asynchronously, the generation rate of encoded data can be suitably controlled when there is no continuity with image data in a previous frame such as an I picture, even if the rate control disclosed in MPEG-4 Visual Part (Recommendation ISO/IEC 14496-2: 1999 (E) Annex L) cannot be performed. As a result, encoded data can be generated by compressing image data at a constant rate.

In this image data compression device, the rate control section may calculate the quantization parameter to be equal to or less than the upper threshold and equal to or greater than the lower threshold, by using the average data size.

This enables a rate control optimizing compression efficiency and image quality to be easily implemented.

In this image data compression device, the rate control section may calculate the average data size after the quantization section has quantized image data for M frames (M≧N, M is an integer) by a predetermined quantization step.

This enables to prevent unnecessary rate control when an average value of data sizes of encoded data for previous N frames is not accurate, whereby deterioration of image quality can be prevented.

This image data compression device may further comprise a quantization table storing a quantization step value, wherein the rate control section may change the quantization step by performing quantization using a product of the quantization parameter and the quantization step value.

This image data compression device may further comprise a discrete cosine transform section which supplies image data subjected to a discrete cosine transform to the quantization section in frame units.

This image data compression device may comprise: a hardware processing section which processes moving image data by hardware; and a software processing section which generates the encoded data by encoding the quantized data read from the FIFO buffer section by software, wherein the hardware processing section may include the quantization section and the FIFO buffer section; and wherein the software processing section may include the encoded data generation section and the rate control section.

Most of the quantized moving image data is zero data and the amount of information is significantly small in comparison with the data before the quantization in many cases. Moreover, operation load for encoding is generally small. Therefore, when the processing in which the amount of information is small and the operation load is reduced is performed by the software processing section, the processing load is small. On the contrary, the amount of information is great and the operation is complicated in most quantization processing. Therefore, the processing load is heavy for software processing. If this heavy processing is standardized, the necessity of changing the processing is limited because most of the processing is repetition. Therefore, this is suitable for the hardware processing section. Furthermore, since the amount of data processed by the hardware processing section is small, the amount of data transmitted from the hardware processing section to the software processing section is small, whereby the transmission load is reduced. Since the FIFO buffer section is provided between the software processing section and the hardware processing section, the software processing and the hardware processing can be processed in parallel. In addition, a reduction of the size of the device and a reduction of power consumption can be implemented together by utilizing suitably the software processing and the hardware processing.

In this image data compression device, the hardware processing section may output a difference between input image data in a current frame and previous image data in a frame immediately before the current frame as motion vector information;

the hardware processing section may perform a discrete cosine transform of the motion vector information and output resulting information as image data to the quantization section; and the hardware processing section may generate the previous image data based on inverse-quantized data obtained by inverse-quantizing the quantized data by using the quantization step.

In this image data compression device, the software processing section may encode the quantized data read from the FIFO buffer section into a variable length code.

In this image data compression device, the software processing section may perform scan processing in which the quantized data read from the FIFO buffer section is rearranged, and encode a result of the scan processing into a variable length code.

In this image data compression device, the software processing section may calculate a DC component and an AC component from the quantized data read from the FIFO buffer section, perform scan processing in which the DC component and the AC component are rearranged, and encode a result of the scan processing into a variable length code.

According to one embodiment of the present invention, there is provided an encoder which performs compression processing for image data, the encoder comprising:

an image input interface which performs interface processing for inputting image data;

a quantization section which quantizes image data in frame units;

a FIFO buffer section which buffers quantized data for at least N frames (N is an integer greater than one) from the quantization section; and a host interface which performs interface processing for a host which reads the quantized data stored in the FIFO buffer section asynchronously from writing into the FIFO buffer section, wherein the host calculates a quantization parameter to be equal to or less than an upper threshold of the quantization parameter or to be equal to or greater than a lower threshold of the quantization parameter by using an average data size obtained by averaging the data size of the encoded data for N frames preceding a frame of image data to be quantized by the quantization section; and wherein the quantization section quantizes image data by using a quantization step which is based on the quantization parameter.

In this embodiment, encode processing for compressing moving image data from an imaging section can be shared between the encoder and the host, for example. Therefore, quantization and generation of encoded data of the encode processing can be performed in parallel. Moreover, a reduction of size and power consumption of a device which has the encoder can be implemented together by suitably utilizing the encoder and the host.

In this encoder, when the quantized data read from the FIFO buffer section is data of an intra-frame-coded macroblock which is encoded within one frame, the host may calculate the data size of the encoded data as the average data size, and the quantization section may quantize image data by using the quantization step.

In this encoder, the host may calculate the quantization parameter to be equal to or less than the upper threshold and equal to or greater than the lower threshold, by using the average data size.

The embodiments of the present invention will be described in detail with reference to the drawings. Note that the embodiments described below do not in any way limit the scope of the invention laid out in the claims herein. In addition, not all of the elements of the embodiments described below should be taken as essential requirements of the present invention.

1. MPEG-4

The MPEG-4 encode processing is briefly described below. The decode processing of decoding compressed data encoded by the encode processing is also described below.

FIGS. 1A and 1B are illustrative of the MPEG-4 encode processing and decode processing, respectively. The details of the processing are described in *JPEG & MPEG: Illustrated Image Compression Technology* (Hiroshi Ochi and Hideo Kuroda, Nippon Jitsugyo Publishing Co., Ltd.), for example. In the following description, only the processing relating to the present invention is mainly described.

In the encode processing shown in FIG. 1A, a motion estimation (ME) between two successive images (two frames) is performed (step S1). In more detail, the difference between two images is calculated for a single pixel. Since the difference becomes zero in the image region in which no change occurs between two images, the amount of information can be reduced. The zero data in this image region and the difference (positive and negative components) in the image region in which a change occurs between two images make up information after the motion estimation.

A discrete cosine transform (DCT) is performed (step S2). The DCT is performed in units of 8×8 pixel blocks shown in FIG. 2 to calculate DCT coefficients in block units. The DCT coefficients after the discrete cosine transform represent changes in light and shade of the image in one block by average brightness (DC component) and spatial frequency (AC component). FIG. 3 shows an example of the DCT coefficients in one 8×8 pixel block (quotation from FIG. 5-6 on page 116 of the above-mentioned literature). The DCT coefficient at the upper left corner represents a DC component, and the remaining DCT coefficients represent AC components. The influence on image recognition is small even if high-frequency components of the AC components are omitted.

The DCT coefficients are quantized (step S3). The quantization is performed in order to reduce the amount of information by dividing each DCT coefficient in one block by a quantization step value at the corresponding position in a quantization table. For example, FIG. 5 shows the DCT coefficients in one block obtained by quantizing the DCT coefficients shown in FIG. 3 using a quantization table shown in FIG. 4 (quotation from FIGS. 5-9 and 5-10 on page 117 of the above-mentioned literature). As shown in FIG. 5, most of the DCT coefficients of the high-frequency components become zero data by dividing the DCT coefficients by the quantization step values and rounding off to the nearest whole number, whereby the amount of information is significantly reduced.

A feed-back route is necessary for the encode processing in order to perform the above-described motion estimation between the current frame and the frame subsequent to the current frame. As shown in FIG. 1A, an inverse quantization (iQ), an inverse DCT, and a motion compensation (MC) are performed in the feed-back route (steps S4 to S6). Details of the operation of the motion compensation are omitted. This processing is performed in units of 16×16 pixel macroblocks shown in FIG. 2.

In this embodiment, the series of processing in the steps S1 to S6 is performed by hardware.

DC/AC (direct current/alternating current components) prediction processing performed in a step S7 shown in FIG. 1A and scan processing performed in a step S8 are processing necessary to increase efficiency of encoding into a variable length code (VLC) in a step S9. In the variable length coding in the step S9, the difference in the DC component between adjacent blocks must be encoded, and the order of encoding must be determined for the AC components by scanning the AC components in the block from the low-frequency side to the high-frequency side (also called a "zigzag scan").

The variable length coding in the step S9 is also called entropy encoding, and has a coding principle in which a component with a higher emergence frequency is represented by using a smaller code. The difference between adjacent blocks is encoded for the DC component, and the DCT coefficients are sequentially encoded for the AC components in the scan order from the low-frequency side to the high-frequency side by utilizing the results obtained in the step S7 and the step S8.

The amount of information of image data to be generated changes depending on complexity of the image and intensity of motion. In order to absorb such a change and to transfer information at a constant transfer rate, it is necessary to control the amount of code to be generated. This is achieved by rate control in a step S10. A buffer memory is generally provided for the rate control, and the amount of information to be stored is monitored so that the buffer memory does not overflow to reduce the amount of information to be generated. In more detail, the number of bits which represent the DCT coefficient is reduced by roughening the quantization characteristics in the step S3.

In this embodiment, the series of processing in the steps S7 to S10 is performed by software. Specifically, the series of processing in the steps S7 to S10 is implemented by hardware which reads the software.

FIG. 1B shows the decode processing of the image data compressed by the encode processing shown in FIG. 1A.

The decode processing is achieved by inversely performing the encode processing shown in FIG. 1A in the reverse order. A "postfilter" shown in FIG. 1B is a filter for eliminating block noise. A "YUV/RGB conversion" shown in FIG. 1B means converting the output from the postfilter into an RGB format from a YUV format.

2. Rate Control

The method described in MPEG-4 Visual Part (Recommendation ISO/IEC 14496-2: 1999 (E) Annex L) is briefly described below relating to the rate control performed in the step S10 shown in FIG. 1A. This method changes a quantization parameter at the time of encoding. The quantization characteristics are changed by changing the quantization step of the quantization (step S3) shown in FIG. 1A by changing the quantization parameter, thereby controlling the amount of code (data size) to be generated.

In this method, the amount of code R generated when encoding one frame is controlled by setting a quantization parameter Qc in frame units. In this case, the quantization parameter Qc is calculated according to a model equation shown in FIG. 6.

In FIG. 6, R denotes the amount of code generated when encoding one frame, Qc denotes the quantization parameter, Ec denotes the frame complexity, and $X_1$ and $X_2$ denote parameters of this model. The average absolute value of encode target pixels is used as the frame complexity Ec. The frame complexity Ec is calculated for an inter-frame-coded macroblock after the motion estimation as a value obtained by dividing the sum of the absolute values of the differences $x'_{ij}$ between the current frame and the previous frame by an area A. The frame complexity Ec of an intra-frame-coded macroblock is calculated as a value obtained by dividing the sum of the absolute values ($|x_{ij}-\mu|$) of the differences between the current frame and a reference value $\mu$ by the area A. The reference value $\mu$ may be the average value of all the pixels in the macroblock.

In FIG. 6, the amount of code to be generated is modeled by the quadratic equation of the frame complexity and the reciprocal of the quantization parameter as described above.

Figure 7:
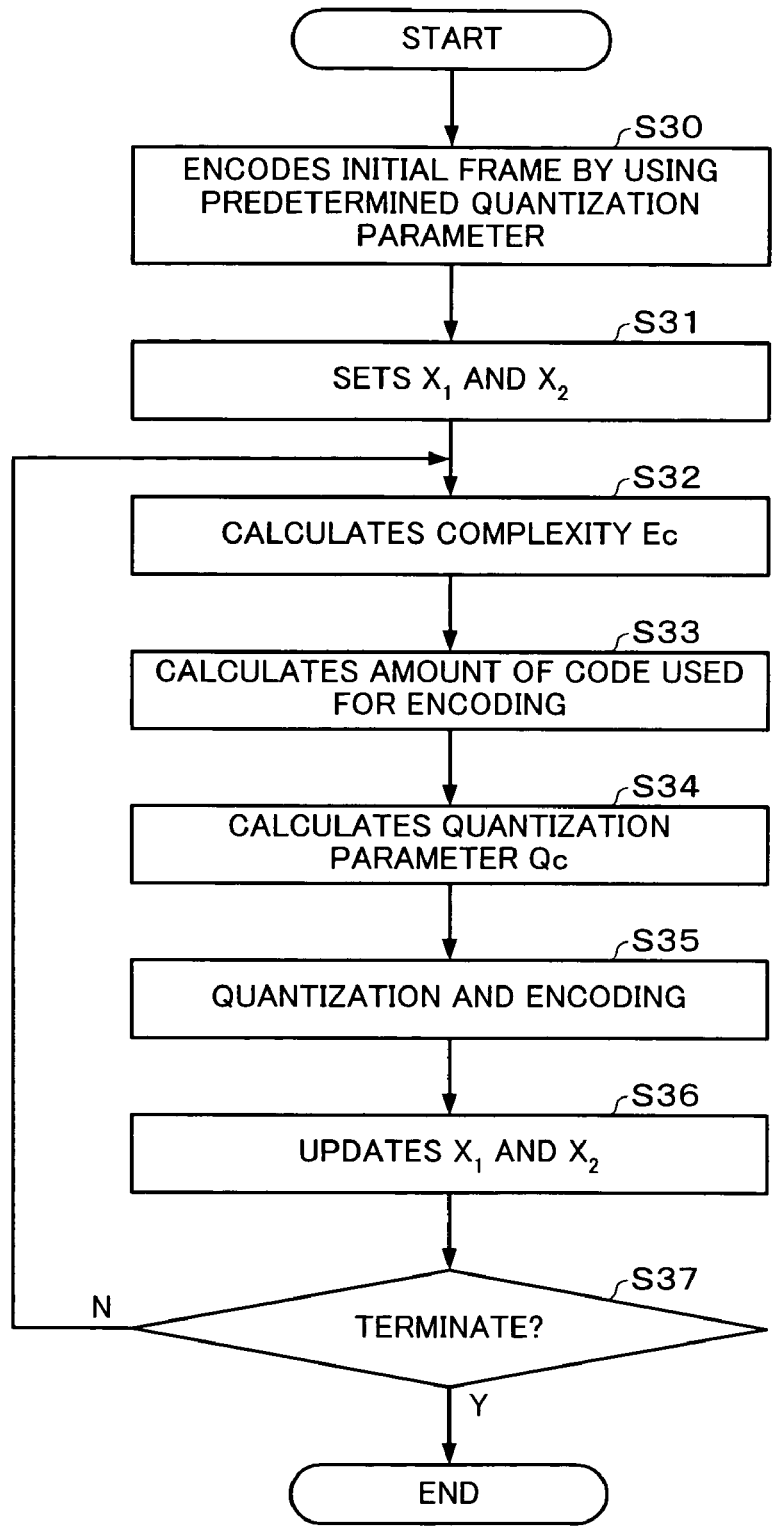
FIG. 7 is a flow chart showing an example of rate control processing using the model equation shown in FIG. 6.

FIG. 7 shows an example of a processing flow of the rate control using the model equation shown in FIG. 6.

The initial frame is encoded using a predetermined quantization parameter (step S30). The initial values of the model parameters $X_1$ and $X_2$ are set (step S31). The complexity Ec of the current frame is calculated (step S32). The complexity Ec can be calculated by using the equation shown in FIG. 6. The amount of code used for encoding is calculated based on the remaining available amount of code and the amount of code used in the previous frame (step S33).

The model parameters $X_1$ and $X_2$ set in the step S31 and the complexity Ec calculated in the step S32 are set in the model equation shown in FIG. 6. A value obtained by subtracting the number of bits other than information such as the header and the motion vector among the number of bits used in the previous frame from the amount of code used for encoding calculated in the step S33 is set in the model equation shown in FIG. 6 as the amount of code R generated when encoding one frame. The quantization parameter Qc is calculated by solving the quadratic equation shown in FIG. 6 in which the parameter is Qc (step S34).

The frame is quantized and encoded using the quantization parameter Qc calculated in the step S34 (step S35), and the model parameters $X_1$ and $X_2$ are calculated from the model equation shown in FIG. 6 based on the quantization parameter and the amount of code generated in the frame encoded one frame before the current frame to update the model parameters $X_1$ and $X_2$ (step S36).

When the processing flow is terminated under a predetermined condition (step S37: Y), the series of processing is terminated (END). When the processing is not terminated (step S37: N), the step S32 is performed. The above-described processing is performed in each frame.

As described above, in the rate control described in MPEG-4 Visual Part (Recommendation ISO/IEC 14496-2: 1999 (E) Annex L), it is necessary to cause the encoding result in the previous frame to be reflected in the encoding of the subsequent frame.

3. Image Data Compression Device

This embodiment provides an image data compression device which allocates the series of encode processing between hardware and software, and optimizes the allocation.

Figure 8:
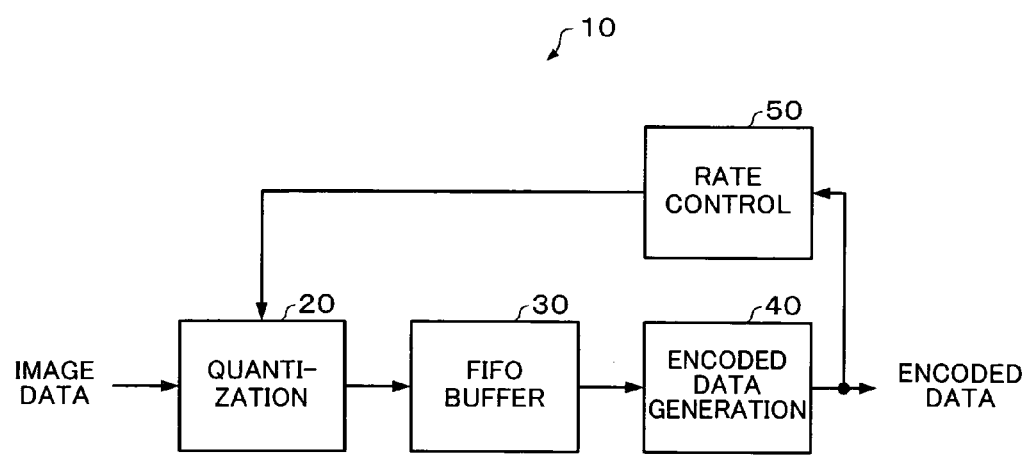
FIG. 8 is a block diagram schematically showing an image data compression device according to one embodiment of the present invention.

FIG. 8 is a block diagram schematically showing the image data compression device according to this embodiment.

The image data compression device 10 includes a quantization section 20. The quantization section 20 performs the processing in the step S3 shown in FIG. 1A. The quantization section 20 quantizes image data in frame units. Specifically, the quantization section 20 quantizes image data and generates quantized data in frame units. The image data may be represented by the DCT coefficients after the DCT processing in the step S2 shown in FIG. 1A, for example. In this case, the DCT coefficients shown in FIG. 3 are quantized as shown in FIG. 5 by being divided by the quantization step values in the quantization table shown in FIG. 4.

The image data compression device 10 includes a FIFO buffer section 30. The quantized data for at least N frames (N is an integer greater than one) quantized by the quantization section 20 is buffered in the FIFO buffer section 30. The quantized data output from the quantization section 20 in frame units is sequentially written into the FIFO buffer section 30. The FIFO buffer section 30 functions as a first-in first-out storage circuit.

The image data compression device 10 includes an encoded data generation section 40. The encoded data generation section 40 reads the quantized data for one frame from the FIFO buffer section 30, and generates encoded data by encoding the quantized data. The encoded data generation section 40 reads the quantized data for one frame from the FIFO buffer section 30 asynchronously from writing into the FIFO buffer section 30.

The heavy load processing of the quantization section 20 is performed by hardware and the small load encode processing of the encoded data generation section 40 is implemented by software processing by providing the FIFO buffer section 30 between the quantization section 20 and the encoded data generation section 40. Moreover, the processing of the quantization section 20 and the encode processing of the encoded data generation section 40 can be performed in parallel.

The following description is given on the assumption that the quantization section 20 is implemented by high-speed hardware and the encoded data generation section 40 is implemented by low-speed software processing, for example. However, this embodiment is not limited thereto. This embodiment is applied to the case where the encoded data generation section 40 reads the quantized data from the FIFO buffer section 30 asynchronously from writing into the FIFO buffer section 30. Therefore, the quantization section 20 may be implemented by high-speed hardware, and the encoded data generation section 40 may be implemented by low-speed hardware, for example. The quantization section 20 and the encoded data generation section 40 may be implemented by hardware which reads software, and perform processing asynchronously.

The image data compression device 10 includes a rate control section 50. The rate control section 50 changes the data size of the encoded data by changing the quantization step of the quantization section 20 using the data size of the encoded data generated by the encoded data generation section 40. As is clear from FIG. 5, the amount of zero data of the quantized DCT coefficients is increased by increasing the quantization step. The amount of zero data of the quantized DCT coefficients is decreased by decreasing the quantization step. The quantized data of which the amount of zero data is changed in this manner is written into the FIFO buffer section 30. As a result, the size of the encoded data obtained by allowing the encoded data generation section 40 to encode the quantized data read from the FIFO buffer section 30 can be changed corresponding to the quantization parameter.

As described above, in the rate control described in MPEG-4 Visual Part (Recommendation ISO/IEC 14496-2: 1999 (E) Annex L), it is necessary to cause the encoding result in the previous frame to be reflected in the encoding of the subsequent a quantization table 22 in which the quantization step values shown in FIG. 4 are set is provided. The quantization section 20 quantizes image data in frame units based on the quantization step values set in the quantization table 22 and the quantization parameter from the rate control section 50. In more detail, the quantization parameter is used as the coefficient of the quantization step values, and the quantization section 20 changes the quantization step by quantizing image data using the product of the quantization parameter and the quantization step values.

The quantization section 20 quantizes image data in frame units at times t1, t2, . . . , and writes the quantized data into the FIFO buffer section 30 in the order of the first frame $F_1$, the second frame $F_2$, . . . . The encoded data generation section 40 reads the quantized data from the FIFO buffer section 30 in frame units asynchronously from the write timing of the quantized data into the FIFO buffer section 30, and performs the encode processing.

The rate control section 50 changes the quantization step of the quantization section 20 using the average data size calculated by averaging the data sizes of the encoded data for four (N=4) frames before the frame (current frame) of the image data quantized by the quantization section 20, for example. This causes the size of the quantized data quantized by the quantization section 20 to be changed, whereby the size of the encoded data generated by the encoded data generation section 40 is also changed.

Figure 10:
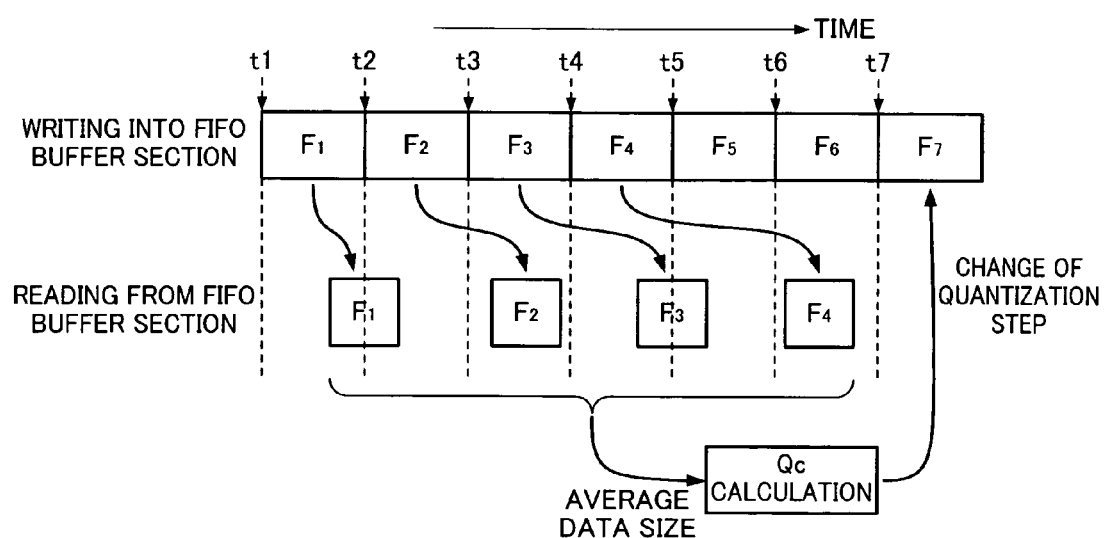
FIG. 10 is a diagram schematically showing operation timing of the rate control shown in FIG. 9.

In FIG. 10, the encoded data generation section 40 sequentially reads the quantized data in the first to fourth frames $F_1$ to $F_4$ from the FIFO buffer section 30, and generates and outputs the encoded data in each frame. In this case, the quantization section 20 quantizes image data in the seventh frame $F_7$.

The rate control section 50 stores the sizes of the encoded data in the first to fourth frames $F_1$ to $F_4$, and calculates the average value of the sizes of the encoded data in the first to fourth frames $F_1$ to $F_4$ as the average data size. As described with frame. However, if the quantization of the quantization section 20 and the encoding of the encoded data generation section 40 are allocated between hardware and software, the quantization and the encoding are processed asynchronously. Therefore, the quantized data read from the FIFO buffer section 30 may be the data in a frame two or more frames before the frame of the data quantized by the quantization section 20. Therefore, the rate control described in MPEG-4 Visual Part (Recommendation ISO/IEC 14496-2: 1999 (E) Annex L) in which the encoding result in the previous frame is caused to be reflected in the encoding of the subsequent frame cannot be implemented.

In this embodiment, the rate control section 50 calculates the average data size by averaging the data sizes of the encoded data for N frames before the frame of the image data quantized by the quantization section 20, and calculates the quantization parameter using the average data size. The quantization step of the quantization section 20 is changed based on the quantization parameter. For example, when the image data quantized by the quantization section 20 is in the Lth frame (L is a positive integer), the rate control section 50 changes the quantization step using the average data size calculated by averaging the data sizes of the encoded data in the (L-P)th frame (L>P, P is a positive integer) to the (L-P-N+1)th frame (L-P>N−1) for previous N frames of the Lth frame.

Figure 9:
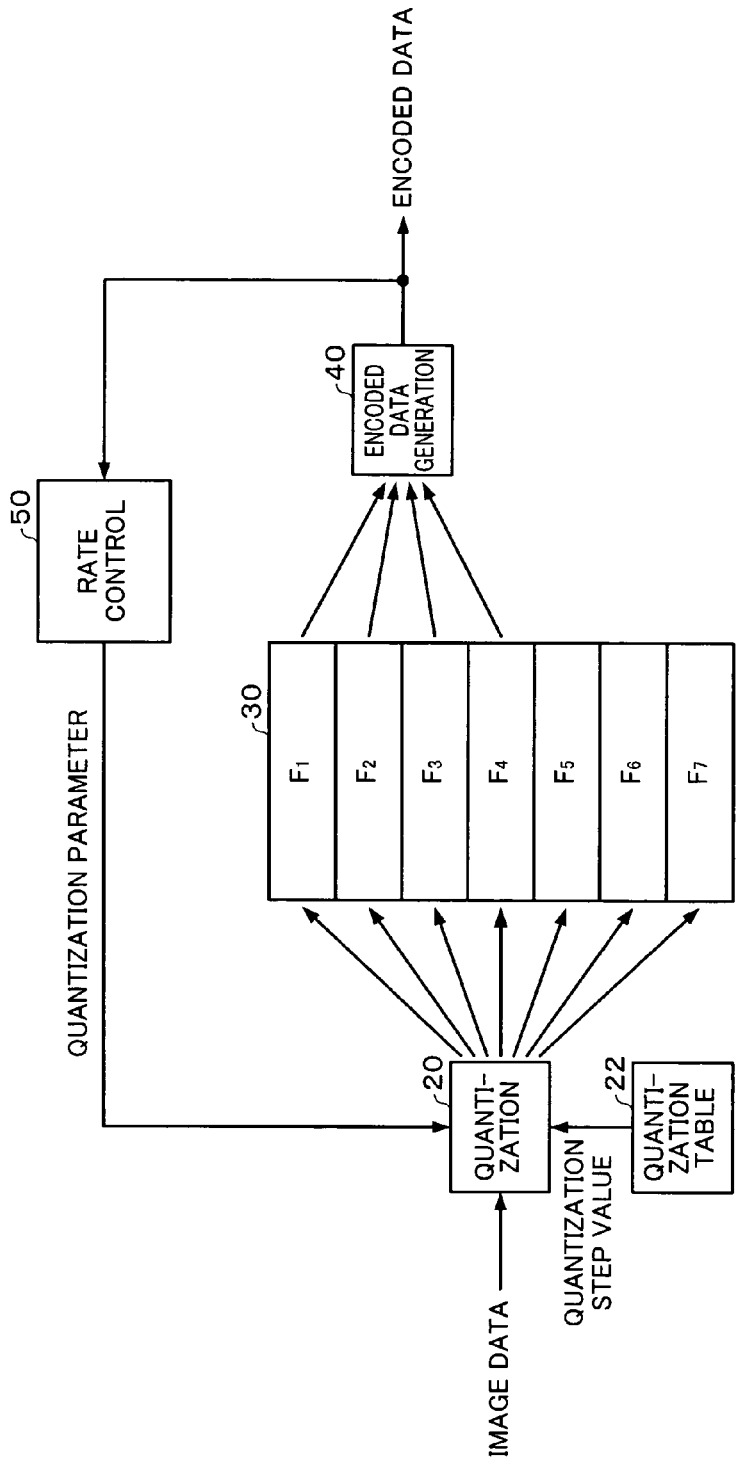
FIG. 9 is a diagram illustrative of the rate control according to one embodiment of the present invention.

FIG. 9 is a diagram illustrative of the rate control in this embodiment. Note that components corresponding to those in the image data compression device 10 shown in FIG. 8 are denoted by the same reference numbers and further description thereof is omitted. In FIG. 9, the FIFO buffer section 30 can store quantized data for seven frames.

FIG. 10 is a diagram schematically showing operation timing of the rate control shown in FIG. 9.

The quantization section 20 quantizes image data in frame units. For example, reference to FIGS. 6 and 7, the rate control section 50 calculates the amount of code used for encoding of the seventh frame $F_7$ using the average data size, and calculates the quantization parameter Qc. As a result, the quantization section 20 quantizes the image data in the seventh frame $F_7$ using the product of the quantization parameter Qc calculated using the average value of the data sizes of the encoded data in the first to fourth frames $F_1$ to $F_7$ and the quantization step values in the quantization table 22. The quantization result is written into the FIFO buffer section 30. This enables the encoded data to be generated at a desired rate.

In this rate control, a constant rate must be maintained even when the data size rapidly changes. Therefore, if the value N is decreased, the quantization step follows when the data size in only one frame rapidly changes, whereby the image quality of other frames deteriorates. On the other hand, if the value N is increased, the quantization step changes to only a small extent when the data size in only one frame rapidly changes.

As an example in which the data size rapidly changes, the case where image data of an intra-frame-coded (I) picture (frame which has an intra-frame-coded macroblock which is encoded within one frame) is input can be given. In this case, since there is no continuity with the image data in the previous frame, the generation rate of the encoded data is rapidly decreased, thereby making it necessary to modify the rate control method.

In this embodiment, when the quantized data read from the FIFO buffer section 30 is data of an intra-frame-coded macroblock which is encoded within one frame, the rate control section 50 calculates the data size of the encoded data obtained by encoding the quantized data as the average data size. This enables the quantization step to appropriately follow even when there is no continuity with the image data in the previous frame such as the I picture.

The rate control section 50 may calculate the average data size after the quantization section 20 quantizes the image data for M frames (M≧N, M is an integer) by a predetermined quantization step (quantization step determined in advance), and change the quantization step using the average data size. This prevents unnecessary rate control from being performed when the average value of the data sizes of the encoded data in the previous N frames is not accurate, whereby deterioration of the image quality can be prevented.

Even if the rate control is performed as described above, block noise may significantly occur in the image obtained by decoding the encoded compressed data depending on the encoding target image. This is because, even if the generation rate of compressed data is controlled by the rate control method described in MPEG-4 Visual Part (Recommendation ISO/IEC 14496-2: 1999 (E) Annex L), block noise is generally displayed in the image generated by decompressing the compressed data, whereby the display quality may deteriorate.

Figure 11:
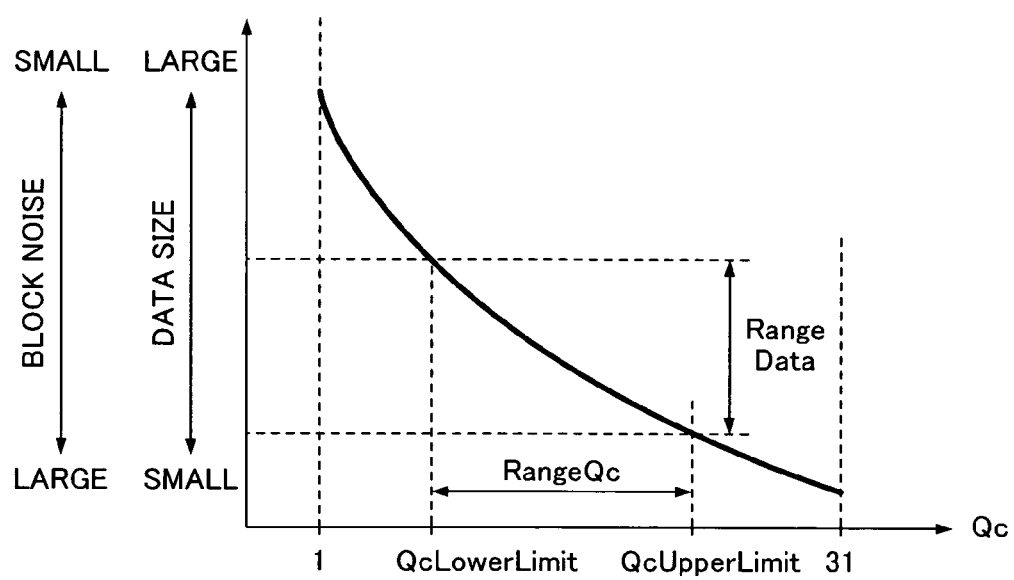
FIG. 11 is a graph schematically showing the relationship among a quantization parameter, the data size of encoded data, and block noise.

FIG. 11 schematically shows the relationship among the quantization parameter, the data size of the encoded data, and block noise. In FIG. 11, the horizontal axis indicates the quantization parameter, and the vertical axis indicates the data size and block noise. In the rate control described in MPEG-4 Visual Part (Recommendation ISO/IEC 14496-2: 1999 (E) Annex L), the range of the value of the quantization parameter Qc is 1 to 31.

As shown in FIG. 11, the image data is thinned out to a greater extent as the quantization parameter is increased, whereby a larger number of DCT coefficients become zero data. This reduces the size of the quantized data, whereby the size of the encoded data can be reduced. However, block noise significantly occurs in the image generated by decoding the encoded data. Specifically, the amount of block noise is increased as the data size is reduced.

Therefore, in this embodiment, a quantization parameter upper threshold QcUpperLimit is provided so that the quantization parameter Qc does not exceed a predetermined value. The quantization parameter upper threshold QcUpperLimit is set before the rate control. Therefore, the rate control section 50 calculates the quantization parameter to be equal to or less than the quantization parameter upper threshold by using an average data size calculated by averaging data sizes of encoded data for N frames before a frame of image data to be quantized by the quantization section 20. A problem in which block noise significantly occurs in the image obtained by decoding the encoded compressed data can be prevented, even if the rate control is performed as described above, by setting the quantization parameter Qc to be equal to or less than the quantization parameter upper threshold QcUpperLimit (Qc≦QcUpperLimit).

The amount of thinning out of the image data is decreased as the quantization parameter is decreased, whereby the amount of zero data of the DCT coefficients is decreased. Therefore, the size of the quantized data is increased, whereby the size of the encoded data is also increased. On the other hand, the amount of block noise is decreased in the image generated by decoding the encoded data. Specifically, the amount of block noise is decreased as the data size is increased. For example, when the value of the quantization parameter Qc is one, the image quality of the decoded image can be maximized. However, the amount of data used as the encoded data for one frame becomes enormous. In this case, noise in the imaging section which cannot be observed by naked eye entirely remains.

Therefore, in this embodiment, a quantization parameter lower threshold QcLowerLimit is provided so that the quantization parameter Qc does not become smaller than a predetermined value. The quantization parameter lower threshold QcLowerLimit is set before the rate control. Therefore, the rate control section 50 calculates the quantization parameter to be equal to or greater than the quantization parameter lower threshold by using an average data size calculated by averaging data sizes of encoded data for N frames before a frame of image data to be quantized by the quantization section 20. A problem in which the data size is unnecessarily increased can be prevented, even if the rate control is performed as described above, by setting the quantization parameter Qc to be equal to or greater than the quantization parameter lower threshold QcLowerLimit (Qc≧QcLowerLimit).

As described above, the rate control section 50 may calculate the quantization parameter to be equal to or less than the quantization parameter upper threshold QcUpperLimit or equal to or greater than the quantization parameter lower threshold QcLowerLimit by using the average data size. However, the present invention is not limited thereto.

The rate control section 50 may calculate the quantization parameter so that the quantization parameter is equal to or less than the quantization parameter upper threshold QcUpperLimit and is equal to or greater than the quantization parameter lower threshold QcLowerLimit by using the average data size. In this case, the data size can be maintained within a range RangeData by setting the quantization parameter Qc within a range RangeQc shown in FIG. 11, whereby rate control which achieves optimization of compression efficiency and image quality can be easily implemented.

The following description is given on the assumption that the rate control section 50 calculates the quantization parameter to be equal to or less than the quantization parameter upper threshold QcUpperLimit and equal to or greater than the quantization parameter lower threshold QcLowerLimit by using the average data size.

3.1 Calculation Processing of Quantization Parameter Qc

The calculation processing of the quantization parameter Qc performed by the rate control section 50 is described below in detail.

Figure 12:
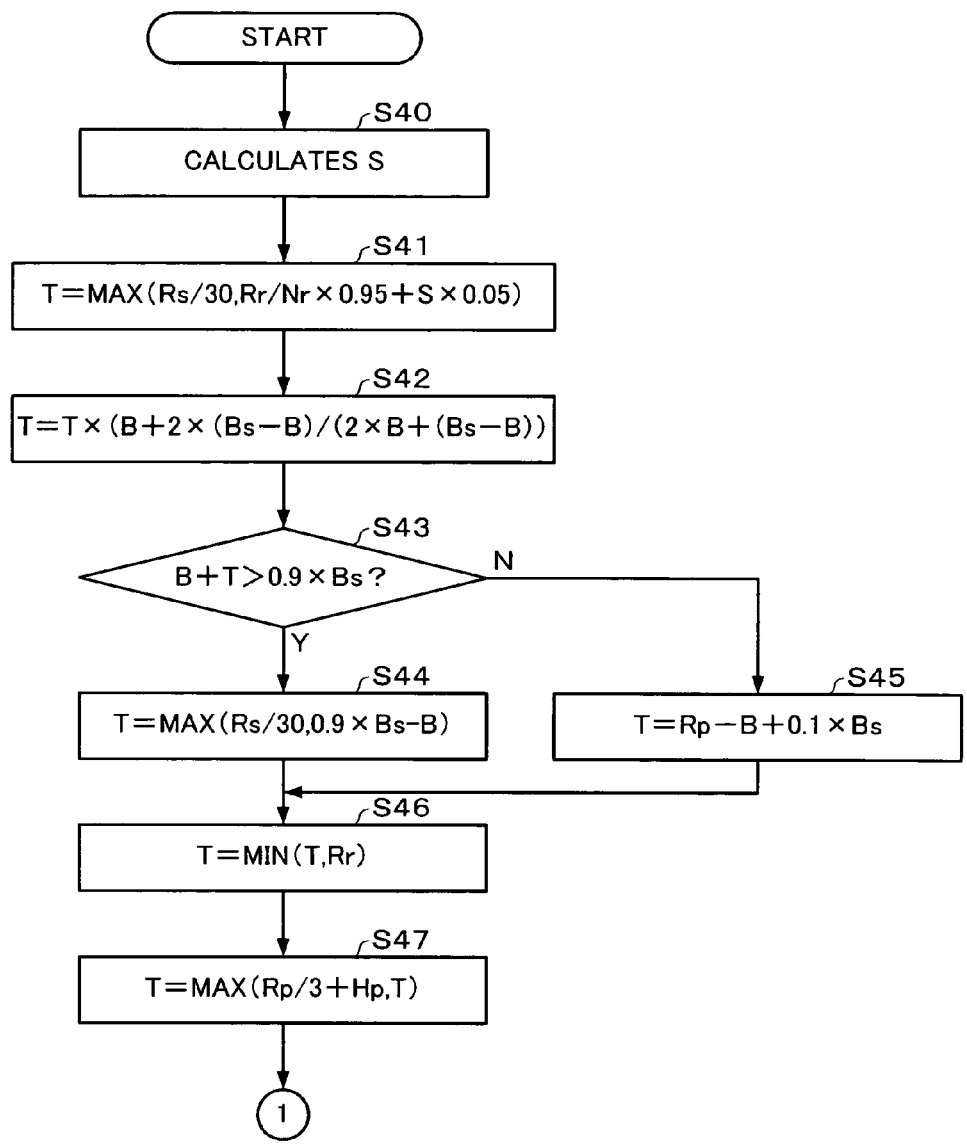
FIG. 12 is a flow chart showing the first half of an example of calculation processing of a quantization parameter.
Figure 13:
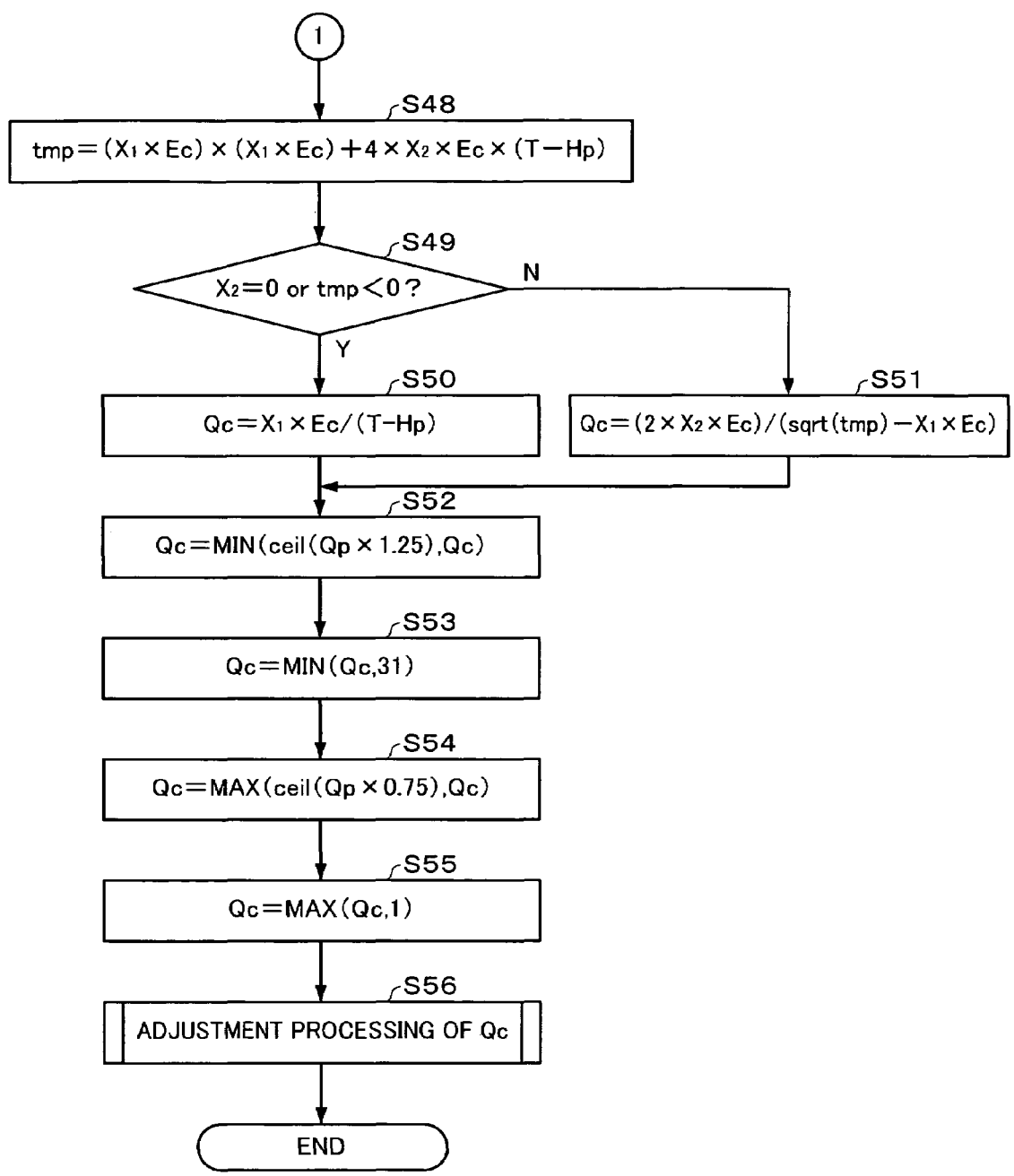
FIG. 13 is a flow chart showing the latter half of the calculation processing of a quantization parameter shown in FIG. 12.

FIGS. 12 and 13 show an example of a processing flow of the calculation processing of the quantization parameter Qc. The flow shown in FIGS. 12 and 13 is described below with reference to a table showing variables used in the calculation processing of the quantization parameter Qc shown in FIG. 14. The flow shown in FIGS. 12 and 13 is performed in each frame.

The number of bits S used in the previous frame is calculated (step S40). The number of bits Rc used for encoding which is calculated in the previous frame (number of bits used for encoding of the current frame) is set as the variable S.

Figure 15:
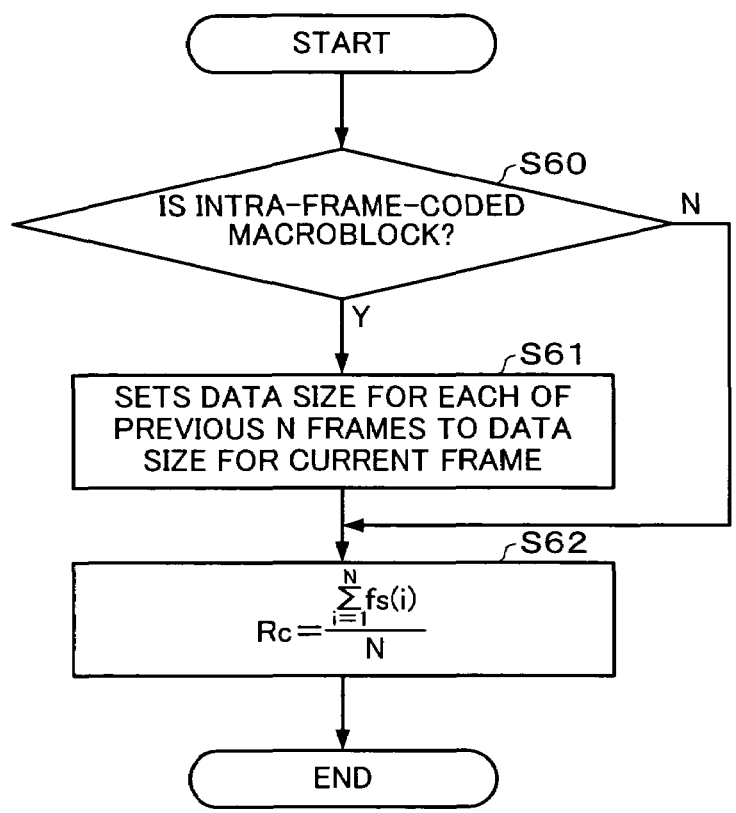
FIG. 15 is a flow chart showing an example of calculation processing of the number of bits used for encoding.

FIG. 15 shows an example of a flow of calculation processing of the number of bits Rc used for encoding. Whether or not the encode target image data is image data of an intra-frame-coded macroblock is judged (step S60). When the image data is judged to be image data of an intra-frame-coded macroblock (step S60: Y), the data sizes of the encoded data for previous N frames are replaced by the data size of the encoded data in the current frame (step S61).

When it is judged that the encode target image data is not image data of an intra-frame-coded macroblock, specifically, when it is judged that the encode target image data is image data of an inter-frame-coded macroblock in the step S60 (step S60: N), or after the step S61 has been performed, the variable Rc is calculated (step S62).

In the step S62, the data size of the encoded data in the previous kth frame (k is a positive integer) is denoted by fs(k), and the variable Rc is calculated by dividing the sum of the data sizes of the encoded data for the previous N frames by the number of frames N. The variable Rc is the average data size.

Each of the previous N frames is a frame at least two frames before the current frame.

The variable Rc thus calculated is set as the variable S in the next frame.

The description is given with reference to FIG. 12. When the variable S has been calculated, the number of bits T assigned to the current frame is calculated (step S41). In the step S41, the average number of bits assigned per frame (Rr/Nr) is calculated from the remaining available number of bits Rr and the remaining number of encoding frames Nr, and the number of bits T assigned to the current frame is calculated from the ratio of the resulting value to the number of bits S assigned to the previous frame. In the step S41, the ratio is 0.95:0.05, for example. The number of bits T assigned to the current frame is set so as not to be less than Rs/30 which is the lower limit.

The number of bits T assigned to the current frame is adjusted from the ratio of the number of currently occupied bits B of the FIFO buffer section 30 to the number of bits Bs of the FIFO buffer section 30 (step S42). As a result, the variable T is increased when the number of currently occupied bits B of the FIFO buffer section 30 is smaller than half of the number of bits Bs of the FIFO buffer section 30, and the variable T is decreased when the number of currently occupied bits B of the FIFO buffer section 30 is greater than half of the number of bits Bs of the FIFO buffer section 30.

Whether or not the sum of the number of currently occupied bits B of the FIFO buffer section 30 and the variable T exceeds 90 percent of the number of bits Bs of the FIFO buffer section 30 is judged (step S43). When it is judged that the sum exceeds 90 percent of the variable Bs (step S43: Y), the variable T is set (clipped) at a value obtained by subtracting the variable B from 90 percent of the number of bits Bs of the FIFO buffer section 30 (step S44). Specifically, the sum of the number of currently occupied bits B of the FIFO buffer section 30 and the variable T is set so as not to exceed 90 percent of the number of bits Bs of the FIFO buffer section 30. The variable T is set so as not to become less than Rs/30 which is the lower limit in the same manner as in the step S41.

When it is judged that the sum does not exceed 90 percent of the variable Bs (step S43: N), the variable T is set at a value obtained by subtracting the variable B from the average number of bits Rp generated per frame and adding 10 percent of the variable Bs to the resulting value (step S45). Specifically, the value obtained by subtracting the average number of bits Rp generated per frame from the sum of the variable Bs and the variable T is set so as not to become less than 10 percent of the number of bits Bs of the FIFO buffer section 30.

After the step S44 or S45, the variable T is set so as not to exceed the remaining available number of bits Rr (step S46). The variable T is then adjusted so as not to change to a large extent between frames (step S47).

In order to calculate the quantization parameter Qc, the model equation shown in FIG. 6 is solved as the quadratic equation of the variable Qc. Therefore, the variable tmp is calculated as shown in FIG. 13 (step S48).

When the model parameter $X_2$ is zero, or the variable tmp is a negative value (step S49: Y), the quantization parameter Qc is calculated from the model equation as the linear equation (step S50). Since the variable R becomes a value obtained by subtracting the number of bits Hp other than the information such as the header among the number of bits used in the previous frame from the number of bits T assigned to the current frame, the quantization parameter Qc is calculated as $Qc=X_1 \times Ec/(T-Hp)$. The variable Ec is the average absolute value of the pixels in the frame as shown in FIG. 6.

When the model parameter $X_2$ is not zero and the variable tmp is equal to or greater than zero (step S49: N), the solution of the quadratic equation derived from the model equation shown in FIG. 6 is used as the quantization parameter Qc (step S51).

After the step S50 or the step S51, the processing is performed so that the difference between the quantization parameter Qc and the quantization parameter Qp in the previous frame is within 25 percent and the quantization parameter Qc is 1 to 31 (step S52, step S53, step S54, and step S55). In the step S52 and the step S54, ceil (x) means that the value x is rounded off to an integer in the positive direction.

In this embodiment, adjustment processing of the quantization parameter Qc calculated in the step S55 is performed (step S56), and the series of processing is finished (END).

Figure 16:
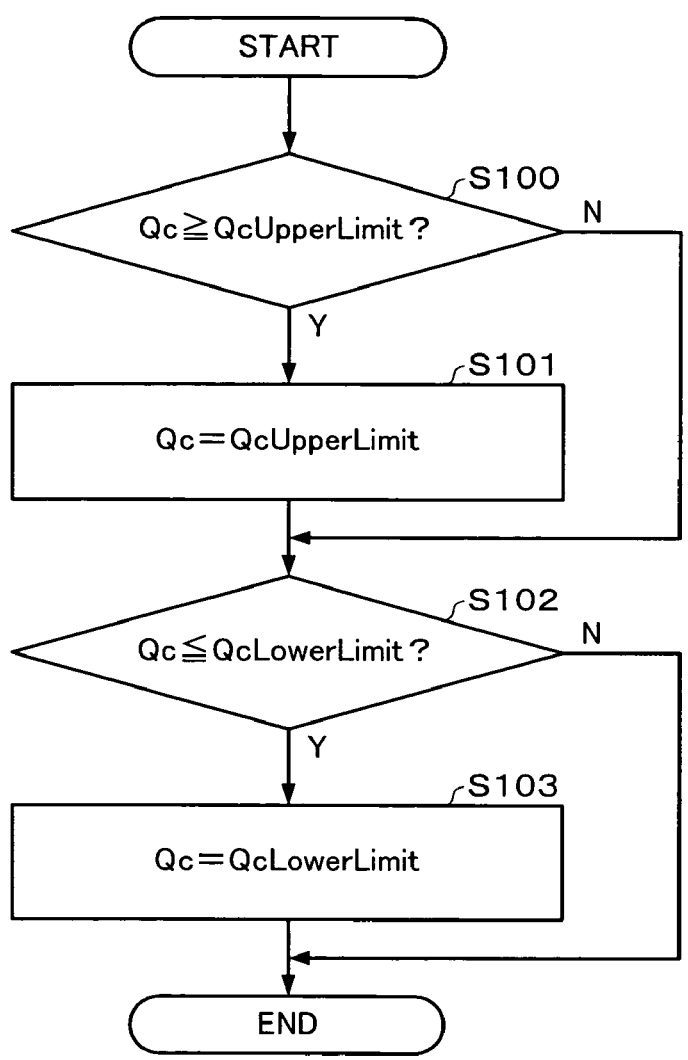
FIG. 16 is a flow chart showing an example of adjustment processing of a quantization parameter.

FIG. 16 shows an example of the adjustment processing of the quantization parameter Qc.

Whether or not the quantization parameter Qc calculated in the step S55 is equal to or greater than the quantization parameter upper threshold QcUpperLimit which is set in advance before this adjustment processing is judged (step S100).

When the quantization parameter Qc is judged to be equal to or greater than the quantization parameter upper threshold QcUpperLimit (step S100: Y), the quantization parameter Qc is set as the quantization parameter upper threshold QcUpperLimit (step S101).

When it is judged that the quantization parameter Qc is not equal to or greater than the quantization parameter upper threshold QcUpperLimit (step S100: N), or after the step S101 has been performed, whether or not the quantization parameter Qc is equal to or less than the quantization parameter lower threshold QcLowerLimit which is set before the adjustment processing (step S102).

When the quantization parameter Qc is judged to be equal to or less than the quantization parameter lower threshold QcLowerLimit (step S102: Y), the quantization parameter Qc is set as the quantization parameter lower threshold QcLowerLimit (step S103).

When it is judged that the quantization parameter Qc is not equal to or less than the quantization parameter lower threshold QcLowerLimit (step S102: N), or after the step S103 has been performed, the current value of the quantization parameter Qc is supplied to the quantization section 20 (END in FIG. 16 or END in FIG. 13).

In FIGS. 13 and 16, the adjustment processing is performed in the step S56, but the present invention is not limited thereto. For example, in FIG. 13, the value "31" in the step S53 may be replaced by the quantization parameter upper threshold QcUpperLimit, and the value "1" in the step S55 may be replaced by the quantization parameter lower threshold QcLowerLimit without providing the step S56.

The quantization step of the quantization section 20 is changed by supplying the quantization parameter Qc thus calculated to the quantization section 20.

Figure 17:
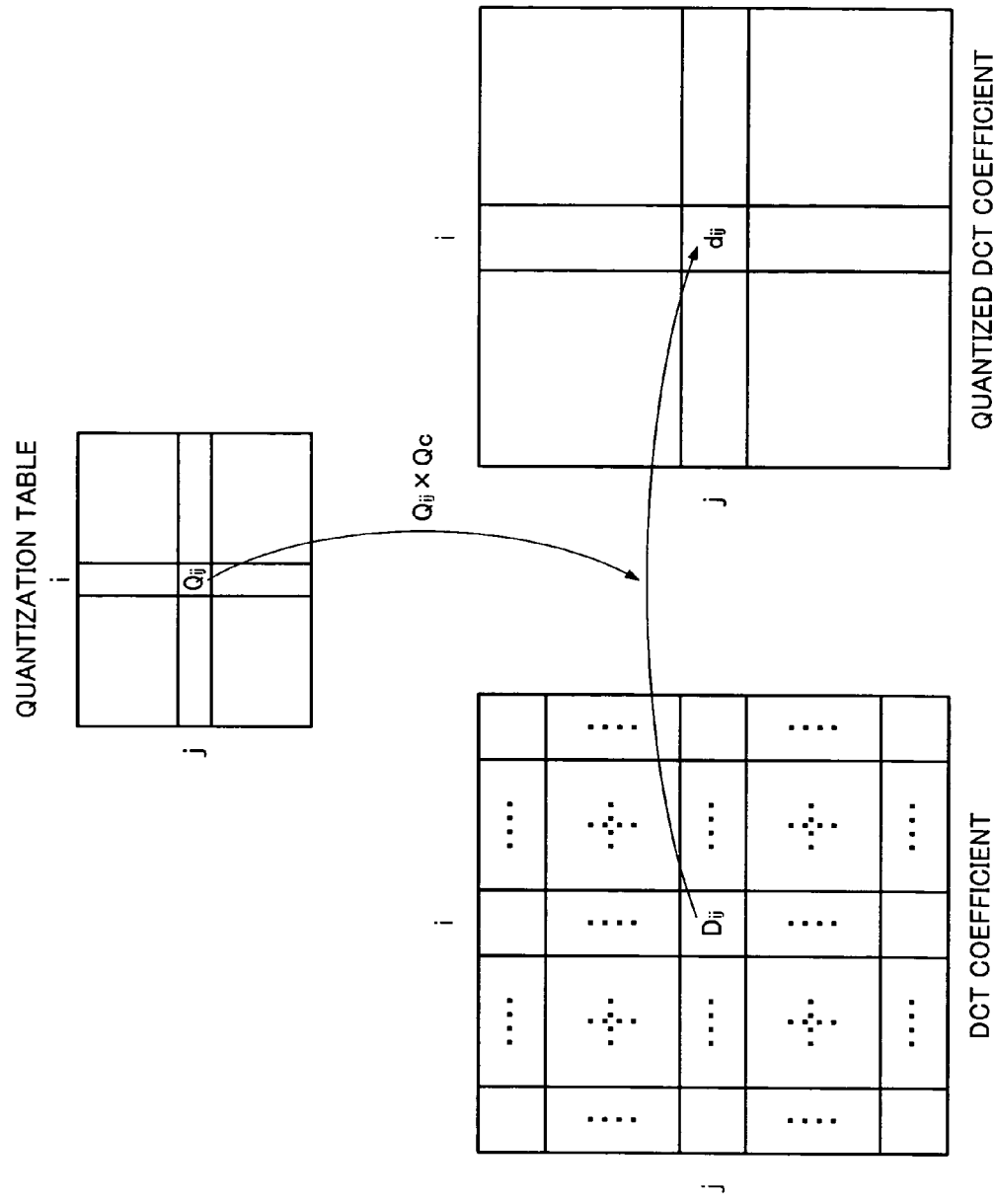
FIG. 17 is a diagram illustrative of quantization processing according to one embodiment of the present invention.

Specifically, as shown in FIG. 17, a DCT coefficient $D_{ij}$ of image data represented by the DCT coefficient is divided by the product of a quantization step value $Q_{ij}$ at the corresponding position in the quantization table and the quantization parameter Qc to calculate a quantized DCT coefficient $d_{ij}$. As a result, the amount of zero data of the quantized DCT coefficients can be increased or decreased.

3.2. Configuration Example

Figure 18:
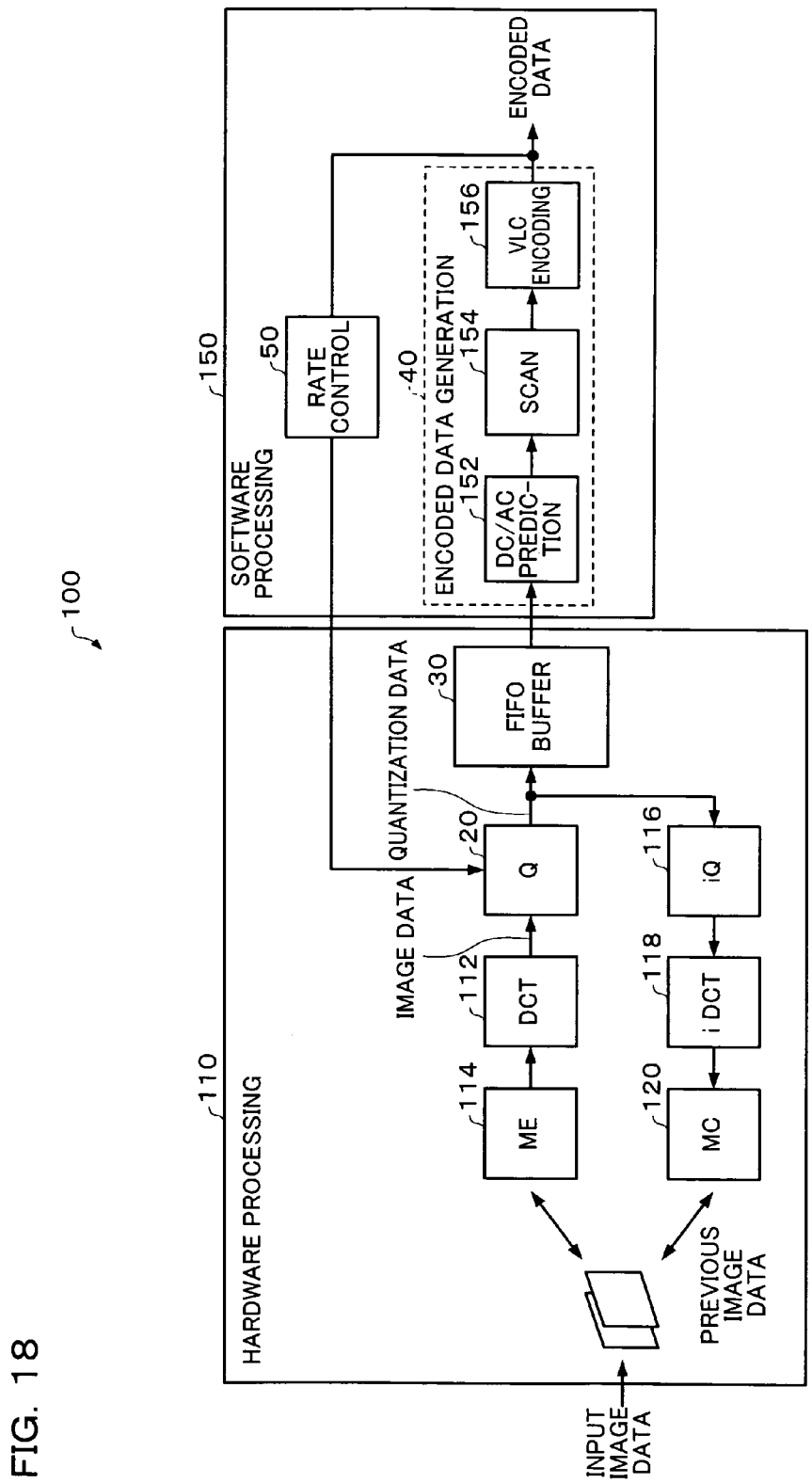
FIG. 18 is a detailed functional block diagram showing an image data compression device according to one embodiment of the present invention.

FIG. 18 shows a detailed functional block diagram showing an image data compression device according to one embodiment of the present invention. Note that components corresponding to those in the image data compression device 10 shown in FIG. 8 are denoted by the same reference numbers and further description thereof is omitted.

An image data compression device 100 shown in FIG. 18 performs compression processing of image data of a moving image conforming to MPEG-4. The image data compression device 100 includes a hardware processing section 110 and a software processing section 150.

The hardware processing section 110 processes image data of a moving image by hardware. The hardware processing section 110 includes the quantization section 20 and the FIFO buffer section 30. The hardware processing section 110 is implemented by hardware such as an ASIC and a dedicated circuit without using software.

The software processing section 150 performs encode processing of quantized data read from the FIFO buffer section 30 by software to generate encoded data. The software processing section 150 includes the encoded data generation section 40 and the rate control section 50. The software processing section 150 is a processing section whose function is implemented by software (firmware). The function of the software processing section 150 is implemented by a CPU (hardware) or the like which reads the software (firmware).

In more detail, the hardware processing section 110 includes a discrete cosine transform (DCT) section 112, a motion estimation section 114, an inverse quantization section 116, an inverse DCT section 118, and a motion compensation section 120. The DCT section 112 performs the processing in the step S2 shown in FIG. 1A. The motion estimation section 114 performs the processing in the step SI shown in FIG. 1A. The inverse quantization section 116 performs the processing in the step S4 shown in FIG. 1A. The inverse DCT section 118 performs the processing in the step S5 shown in FIG. 1A. The motion estimation section 120 performs the processing in the step S6 shown in FIG. 1A.

Specifically, the hardware processing section 110 outputs the difference between input image data in the current frame and image data in the previous frame as motion vector information, performs a discrete cosine transform of the motion vector information, and outputs the resulting information to the quantization section. The hardware processing section 110 generates the previous image data based on inverse-quantized data calculated by inverse-quantizing the quantized data by the quantization step.

The hardware processing section 110 does not necessarily include all of these components. The hardware processing section 110 may have a configuration in which at least one of these components is omitted.

The encoded data generation section 40 of the software processing section 150 includes a DC/AC prediction section 152, a scan section 154, and a VLC coding section 156. The DC/AC prediction section 152 performs the processing in the step S7 shown in FIG. 1A. The scan section 154 performs the processing in the step S8 shown in FIG. 1A. The VLC coding section 156 performs the processing in the step S9 shown in FIG. 1A.

The software processing section 150 does not necessarily include all of these components. The software processing section 150 may have a configuration in which at least one of these components is omitted. For example, the software processing section 150 may encode the quantized data read from the FIFO buffer section 30 into a variable length code. The software processing section 150 may perform scan processing of rearranging the quantized data read from the FIFO buffer section 30, and encode the result of the scan processing into a variable length code. The software processing section 150 may calculate the DC component and the AC component from the quantized data read from the FIFO buffer section 30, perform scan processing of rearranging the DC component and the AC component, and encode the result of the scan processing into a variable length code.

In this embodiment, the steps S1 to S6 shown in FIG. 1A are processed by hardware and the steps S7 to S10 are processed by software for the following reasons. Since zero data accounts for the majority of each block as shown in FIG. 5 after the quantization in the step S3 shown in FIG. 1A, the amount of information on the type of data is significantly small in comparison with the data before the quantization (FIG. 3). Moreover, since the operation load in the steps S7 to S10 is small, the processing load is small even if the processing in the steps S7 to S10 shown in FIG. 1A is processed by software. On the contrary, the quantization in the step S3, DCT in the step S2, and inverse DCT in the step S5 shown in FIG. 1A handle a large amount of information and perform a complicated operation. Therefore, the processing load is heavy for software processing. Although the quantization, DCT, inverse DCT, and motion compensation are heavy load processing, the necessity of changing the processing is limited since the processing is standardized. Moreover, since most of the processing in the steps S1 to S6 shown in FIG. 1A is repetition, this is suitable for hardware processing. Furthermore, since the amount of data after the quantization processed by the hardware processing section 110 is small, the amount of data transferred from the hardware processing section 110 to the software processing section 150 is small, whereby the data transfer control load can be reduced.

Figure 19:
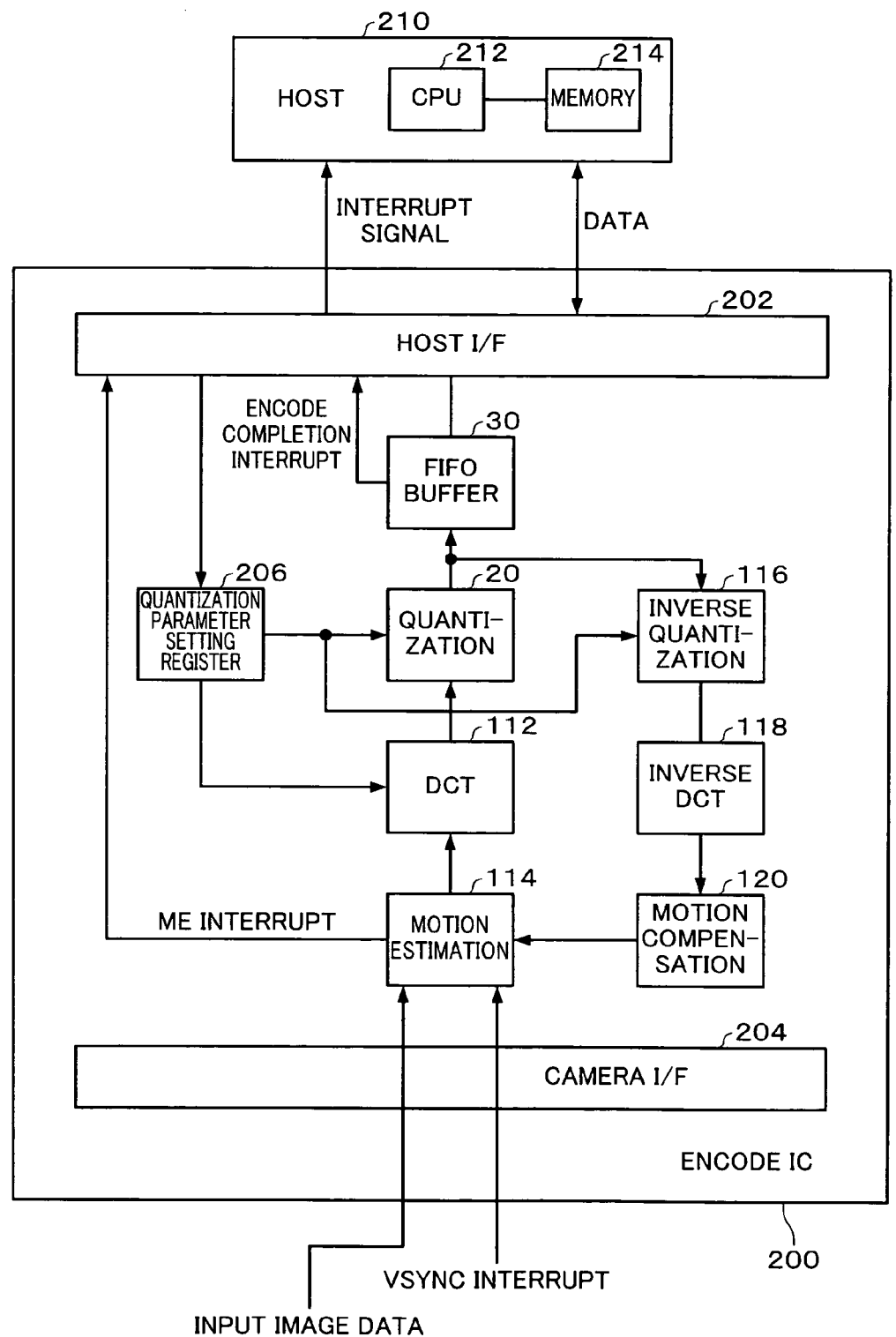
FIG. 19 is a diagram showing hardware configuration of the image data compression device shown in FIG. 18.

FIG. 19 shows a hardware configuration example of the image data compression device 100. In this example, the hardware processing section 110 shown in FIG. 18 is integrated and is mounted on a semiconductor device as an encoder IC (integrated circuit) (encoder in a broad sense) 200. The function of the software processing section 150 shown in FIG. 18 is implemented by a host 210. In FIG. 19, components corresponding to those in the hardware processing section 110 shown in FIG. 18 are denoted by the same reference numbers and further description thereof is omitted.

The host 210 includes a CPU 212 and a memory 214. A program for implementing the functions of the encoded data generation section 40 and the rate control section 50 is stored in the memory 214. The CPU 212 implements the functions of the encoded data generation section 40 and the rate control section 50 by reading the program stored in the memory 214 and performs processing based on the program.

The encoder IC 200 encodes image data of a moving image obtained by imaging by a camera module (not shown) (imaging section in a broad sense) conforming to the MPEG-4 standard, and generates encoded data at a constant rate. Therefore, the encoder IC 200 includes, in addition to the circuit which implements the function of each section of the hardware processing section 110 shown in FIG. 18, a host interface (I/F) 202, a camera I/F (image input interface in a broad sense) 204, and a quantization parameter setting register 206.

The encoder IC 200 and the host 210 implement the function of the image data compression device shown in FIG. 8 or 18 by exchanging an interrupt signal and data.

The host I/F 202 performs interface processing with the host 210. In more detail, the host I/F 202 controls generation of an interrupt signal from the encoder IC 200 to the host 210, and transmission/reception of data between the host 210 and the encoder IC 200. The host I/F 202 is connected with the FIFO buffer section 30.

The camera I/F 204 performs interface processing for inputting image data of a moving image from the camera module (not shown). The camera I/F 204 is connected with the motion estimation section 114.

The camera module (not shown) supplies image data of a moving image obtained by imaging to the encoder IC 200 as input image data. The camera module also supplies a VSYNC signal (vertical synchronization signal) which designates the end of the frame of the input image data to the encoder IC 200. In the encoder IC 200, the camera I/F 204 receives the VSYNC signal from the camera module as a VSYNC interrupt. This causes the encoder IC 200 to start encoding.

The motion estimation section 114 does not perform the motion estimation of the input image data captured for the first time after the encoding is started, and performs the motion estimation after the input image data in the next frame has been captured. Since the details of the motion estimation are the same as described above, description of the operations of the inverse quantization section 116 and the like is omitted. The quantized data for at least one frame is written into the FIFO buffer section 30 in the stage in which the motion estimation is performed. After the motion estimation of the motion estimation section 114 has been completed, the motion estimation section 114 notifies the host 210 of a motion estimation completion interrupt (ME interrupt) through the host I/F 202.

Figure 20:
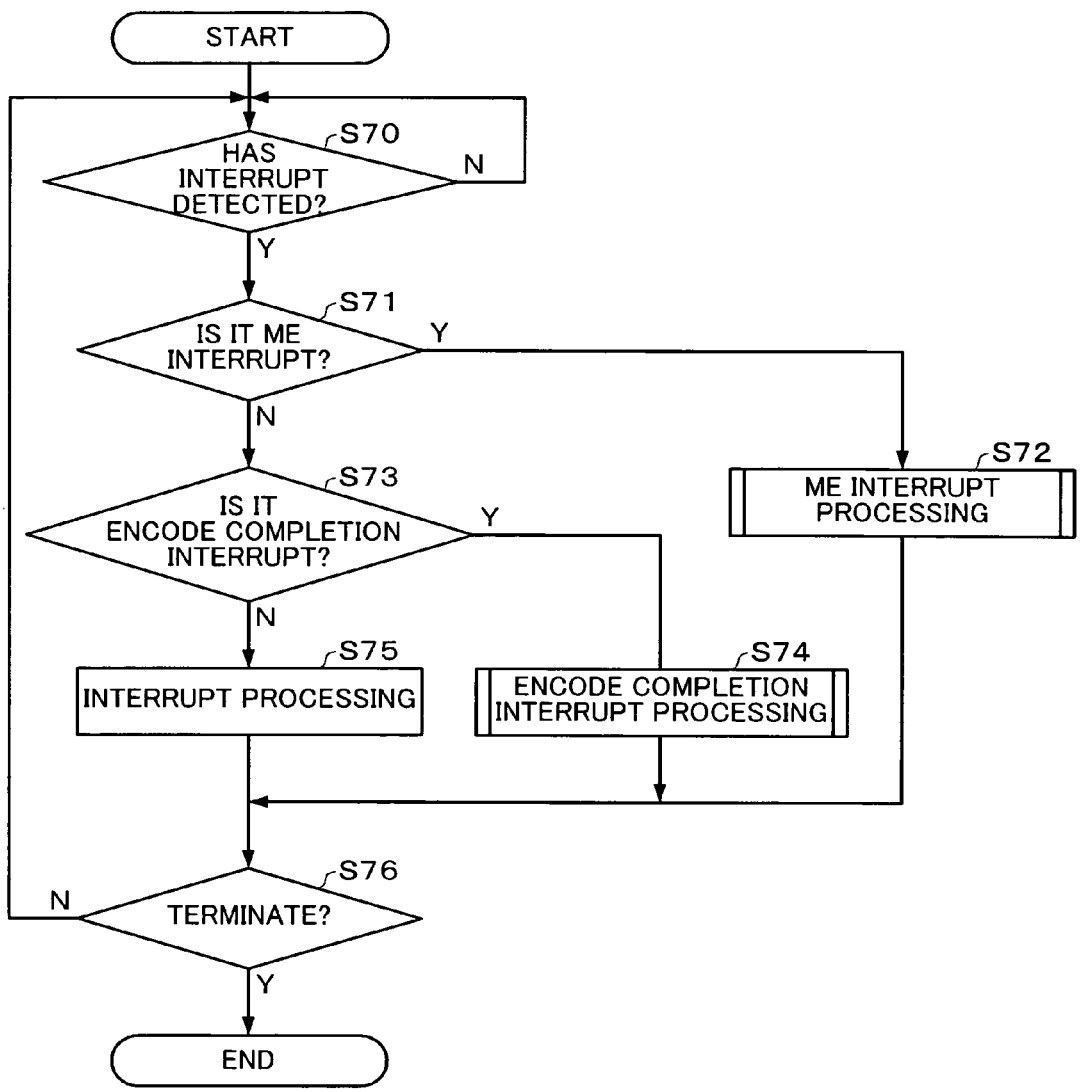
FIG. 20 is a flow chart showing an example of interrupt reception processing performed by a host.

FIG. 20 shows an example of a flow of interrupt reception processing performed by the host 210. A program which implements the processing shown in FIG. 20 is stored in the memory 214. The CPU 212 reads the program and implements the processing shown in FIG. 20.

The CPU 212 monitors an interrupt input (step S70: N). When the CPU 212 detects an interrupt (step S70: Y), the CPU 124 judges whether or not the interrupt is an ME interrupt (step S71).

When the CPU 212 judges that the interrupt is an ME interrupt (step S71: Y), ME interrupt processing described later is performed (step S72).

When the CPU 212 judges that the interrupt is not an ME interrupt (step S71: N), the CPU 124 judges whether or not the interrupt is an encode completion interrupt described later (step S73). When the CPU 212 judges that the interrupt is an encode completion interrupt (step S73: Y), encode completion interrupt processing described later is performed (step S74).

When the CPU 212 judges that the interrupt is not an encode completion interrupt in the step S73 (step S73: N), predetermined interrupt processing is performed (step S75).

After the step S72, the step S74, or the step S75, when the processing is not terminated (step S76: N), the processing in the step S70 is performed. When the processing is terminated (step S76: Y), the series of processing is terminated (END).

Figure 21:
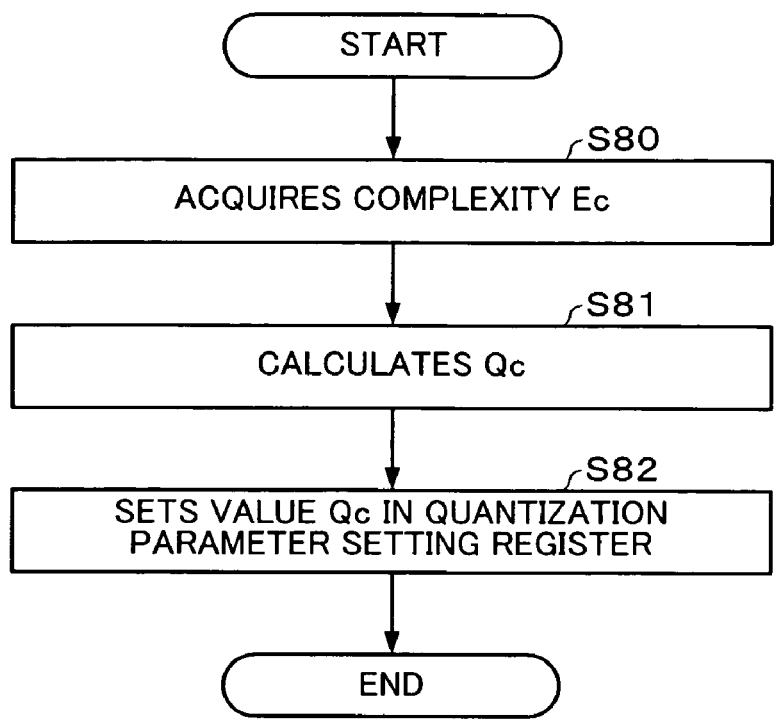
FIG. 21 is a flow chart showing an example of ME interrupt processing.

FIG. 21 shows an example of a flow of the ME interrupt processing. A program which implements the processing shown in FIG. 21 is stored in the memory 214. The CPU 212 reads the program and implements the processing shown in FIG. 21.

The ME interrupt processing is performed in the step S72 shown in FIG. 20.

When the ME interrupt is detected, the CPU 212 reads the complexity Ec generated by the motion estimation section 114 through the host I/F 202 (step S80). The complexity Ec is generated by the motion estimation section 114 according to the equation shown in FIG. 6.

The CPU 212 calculates the quantization parameter Qc (step S81). In more detail, the CPU 212 calculates the quantization parameter Qc as described with reference to FIGS. 12 to 16.

The CPU 212 sets the quantization parameter Qc calculated in the step S81 in a quantization parameter setting register 206 through the host I/F 202 (step S82), and the processing is terminated.

The description is given with reference to FIG. 19. The encoder IC 200 starts processing of the DCT section 112 when the quantization parameter Qc is set in the quantization parameter setting register 206. The quantization section 20 quantizes the DCT coefficients (image data in a broad sense) generated by the DCT section 112 using the quantization parameter set in the quantization parameter setting register 206 and the quantization step values in the quantization table (not shown). The resulting quantized data is written into the FIFO buffer section 30.

When the quantized data is written into the FIFO buffer section 30, the FIFO buffer section 30 notifies the host 210 of the encode completion interrupt which indicates that the encode processing of one frame has been completed through the host I/F 202.

Figure 22:
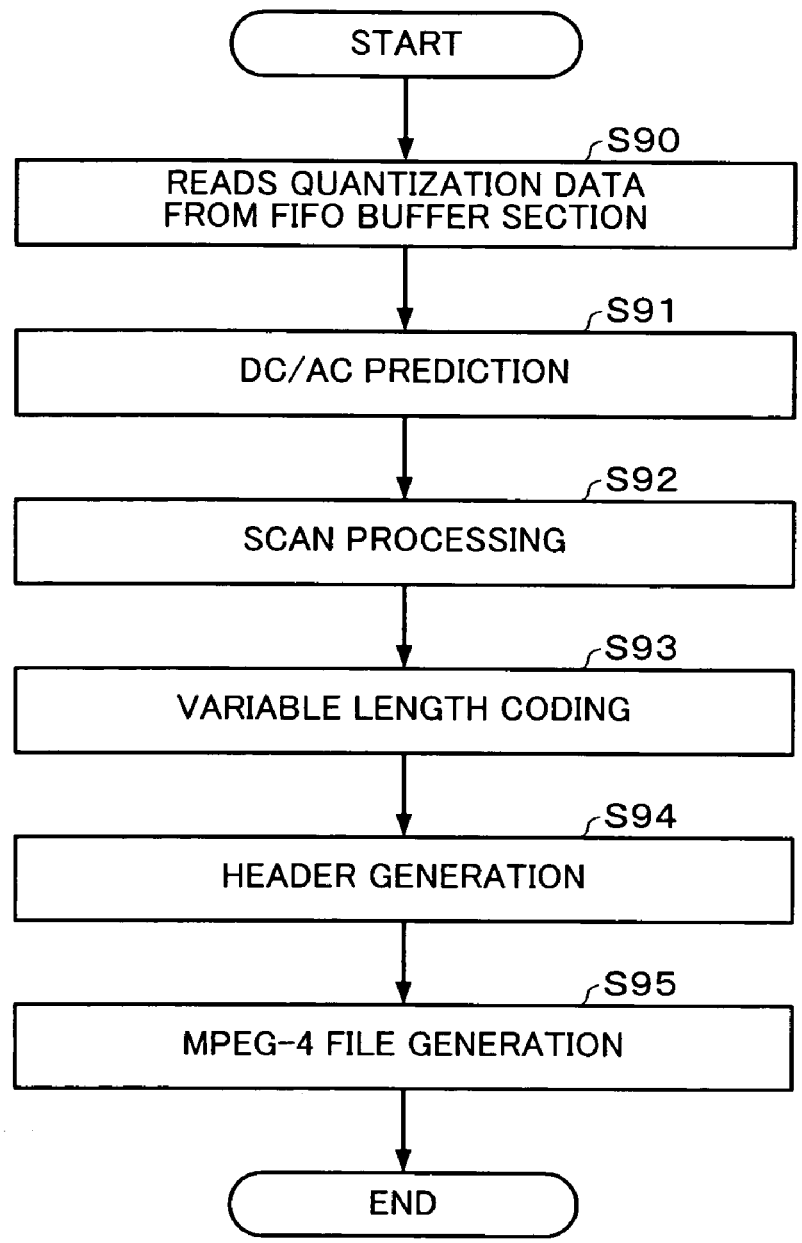
FIG. 22 is a flow chart showing an example of encode completion interrupt processing.

FIG. 22 shows an example of a flow of the encode completion interrupt processing. A program which implements the processing shown in FIG. 22 is stored in the memory 214. The CPU 212 reads the program and implements the processing shown in FIG. 22.

The encode completion interrupt processing is performed in the step S74 shown in FIG. 20.

When the CPU 212 detects the encode completion interrupt, the CPU 212 reads the quantized data from the FIFO buffer section 30 in frame units (step S90).

The CPU 212 performs DC/AC prediction processing (step S91), scan processing (step S92), and variable length coding processing (step S93) in macroblock units to generate encoded data.

The CPU 212 adds a macroblock header to the encoded data generated in the step S93. The resulting encoded data is performed for one video object plane (VOP), a GOV header and a VOP header are generated based on the calculated quantization parameter, and, when the encoding of a predetermined number of frames is completed, the resulting encoded data is output as an MPEG-4 file (step S95).

The compression processing of image data is allocated between and performed by the hardware processing section 110 and the software processing section 150 as described above.

4. Display Controller

The function of the above-described encoder IC may be applied to a display controller.

Figure 23:
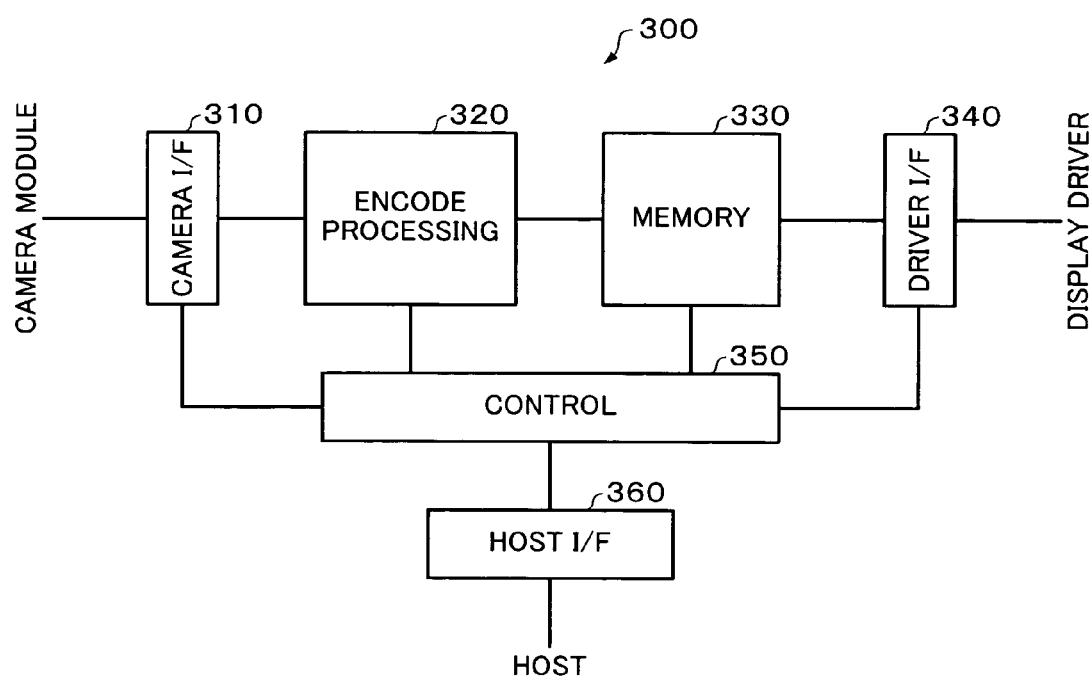
FIG. 23 is a block diagram showing a display controller according to one embodiment of the present invention.

FIG. 23 is a block diagram showing a display controller according to one embodiment of the present invention.

A display controller 300 includes a camera I/F 310, an encode processing section 320, a memory 330, a driver I/F 340, a control section 350, and a host I/F 360.

The camera I/F 310 is connected with a camera module (not shown). The camera module outputs input image data of a moving image obtained by imaging in a YUV format, and outputs a synchronization signal (VSYNC signal, for example) which designates the end of one frame. The camera I/F 310 performs interface processing for receiving the input image data of the moving image generated by the camera module.

The encode processing section 320 is a section in which the functions of the host I/F 202 and the camera I/F 204 in the encoder IC 200 shown in FIG. 19 are omitted. Specifically, the encode processing section 320 has the function of each of the quantization section 20, the FIFO buffer section 30, the DCT section 112, the motion estimation section 114, the inverse quantization section 116, the inverse DCT section 118, the motion compensation section 120, and the quantization parameter setting register 206 shown in FIG. 19.

The memory 330 stores encoded data which is the output from the encode processing section 320. The memory 330 stores image data to be displayed on a display panel. The driver I/F 340 reads the image data from the memory 330 in a predetermined cycle, and supplies the image data to the display driver which drives the display panel. The driver I/F 340 performs interface processing for transmitting the image data to the display driver.

The control section 350 controls the camera I/F 310, the encode processing section 320, the memory 330, and the driver I/F 340. The control section 350 performs reception processing of the input image data from the camera module, encode processing of the input image, write processing of the encoded data into the memory 330, read processing of the display image data from the memory 330, and transmission processing of the image data to the display driver according to instructions from a host (not shown) through the host I/F 360.

Figure 24:
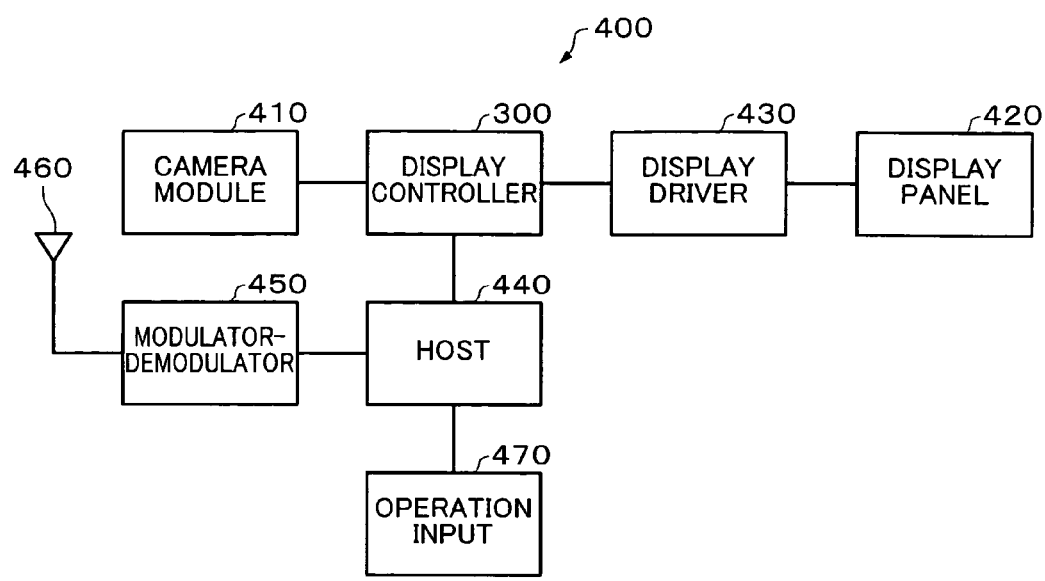
FIG. 24 is a block diagram showing an example of an electronic instrument to which the display controller shown in FIG. 23 is applied.

FIG. 24 is a block diagram showing an example of an electronic instrument to which the display controller shown in FIG. 23 is applied. The configuration of a portable telephone is shown in this figure as an electronic instrument. Note that components corresponding to those in FIG. 23 are denoted by the same reference numbers and further description thereof is omitted.

A portable telephone 400 includes a camera module 410. The camera module 410 includes a charge-coupled device (CCD) camera, and supplies data of an image taken by the CCD camera to the display controller 300 in a YUV format.

The portable telephone 400 includes a display panel 420. A liquid crystal display panel may be employed as the display panel 420. In this case, the display panel 420 is driven by a display driver 430. The display panel 420 includes a plurality of scan lines, a plurality of data lines, and a plurality of pixels. The display driver 430 has a function of a scan driver which selects the scan line in units of one or more scan lines, and a function of a data driver which supplies voltage corresponding to image data to the data lines.

The display controller 300 is connected with the display driver 430, and supplies image data to the display driver 430.

A host 440 is connected with the display controller 300. The host 440 controls the display controller 300. The host 440 demodulates image data received through an antenna 460 using a modulator-demodulator section 450, and supplies the demodulated image data to the display controller 300. The display controller 300 causes the display driver 430 to display an image on the display panel 420 based on the image data.

The host 440 has the function of the host 210 shown in FIG. 19. The host 440 encodes the image data generated by the camera module 410 using the encode processing section 320, modulates the encoded data using the modulator-demodulator section 450, and directs transmission of the modulated data to other communication device through the antenna 460. The display controller 300 encodes the image data generated by the camera module 410, and outputs the encoded data to the host 440.

The host 440 performs transmission-reception processing of image data, encode processing, imaging by the camera module 410, and display processing of the display panel based on operation information from an operation input section 470.

A liquid crystal display panel is shown in FIG. 24 as an example of the display panel 420, but the present invention is not limited thereto. The display panel 420 may be an electroluminescence or plasma display device. The above embodiments of the present invention can be applied to a display controller which supplies image data to a display driver which drives these display devices.

Although only some embodiments of the present invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. An image data compression device used to compress image data, the image data compression device comprising:
    a quantization section which quantizes image data in frame units;
    a FIFO buffer section which buffers quantized data for at least N frames (N is an integer greater than one) from the quantization section;
    an encoded data generation section which reads the quantized data from the FIFO buffer section asynchronously from writing into the FIFO buffer section, and generates encoded data by encoding the quantized data; and
    a rate control section which changes a quantization step of the quantization section by using the data size of the encoded data to change a data size of encoded data to be processed,
    wherein the rate control section calculates a quantization parameter to be equal to or less than an upper threshold of the quantization parameter or to be equal to or greater than a lower threshold of the quantization parameter by using an average data size obtained by averaging the data size of the encoded data for N frames preceding a frame of image data to be quantized by the quantization section; and
    wherein the rate control section changes the quantization step based on the quantization parameter.

2. The image data compression device as defined in claim 1,
wherein, when the quantized data read from the FIFO buffer section is data of an intra-frame-coded macroblock which is encoded within one frame, the rate control section calculates the data size of the encoded data as the average data size.

3. The image data compression device as defined in claim 1,
wherein the rate control section calculates the quantization parameter to be equal to or less than the upper threshold and equal to or greater than the lower threshold, by using the average data size.

4. The image data compression device as defined in claim 1,
wherein the rate control section calculates the average data size after the quantization section has quantized image data for M frames ($M \geq N$, M is an integer) by a predetermined quantization step.

5. The image data compression device as defined in claim 1, further comprising:
a quantization table storing a quantization step value,
wherein the rate control section changes the quantization step by performing quantization using a product of the quantization parameter and the quantization step value.

6. The image data compression device as defined in claim 1, further comprising:
a discrete cosine transform section which supplies image data subjected to a discrete cosine transform to the quantization section in frame units.

7. The image data compression device as defined in claim 1, comprising:
a hardware processing section which processes moving image data by hardware; and
a software processing section which generates the encoded data by encoding the quantized data read from the FIFO buffer section by software,
wherein the hardware processing section includes the quantization section and the FIFO buffer section; and
wherein the software processing section includes the encoded data generation section and the rate control section.

8. The image data compression device as defined in claim 7,
wherein the hardware processing section outputs a difference between input image data in a current frame and previous image data in a frame immediately before the current frame as motion vector information;
wherein the hardware processing section performs a discrete cosine transform of the motion vector information and outputs resulting information as image data to the quantization section; and
wherein the hardware processing section generates the previous image data based on inverse-quantized data obtained by inverse-quantizing the quantized data by using the quantization step.

9. The image data compression device as defined in claim 8,
wherein the software processing section encodes the quantized data read from the FIFO buffer section into a variable length code.

10. The image data compression device as defined in claim 9,
wherein the software processing section performs scan processing in which the quantized data read from the FIFO buffer section is rearranged, and encodes a result of the scan processing into a variable length code.

11. The image data compression device as defined in claim 10,
wherein the software processing section calculates a DC component and an AC component from the quantized data read from the FIFO buffer section, performs scan processing in which the DC component and the AC component are rearranged, and encodes a result of the scan processing into a variable length code.

12. An image data compression device used to compress image data, the image data compression device comprising:
a quantization section which quantizes image data in frame units;
a FIFO buffer section which buffers quantized data for a plurality of frames from the quantization section;
an encoded data generation section which reads the quantized data from the FIFO buffer section asynchronously from writing into the FIFO buffer section, and generates encoded data by encoding the quantized data; and
a rate control section which changes a quantization step of the quantization section by using the data size of the encoded data to change a data size of encoded data to be processed,
wherein the rate control section calculates a quantization parameter to be equal to or less than an upper threshold of the quantization parameter or to be equal to or greater than a lower threshold of the quantization parameter, and changes the quantization step based on the quantization parameter.

13. The image data compression device as defined in claim 12,
wherein the rate control section calculates the quantization parameter to be equal to or less than the upper threshold and equal to or greater than the lower threshold.

14. The image data compression device as defined in claim 12, further comprising:
a quantization table storing a quantization step value,
wherein the rate control section changes the quantization step by performing quantization using a product of the quantization parameter and the quantization step value.

15. The image data compression device as defined in claim 12, further comprising:
a discrete cosine transform section which supplies image data subjected to a discrete cosine transform to the quantization section in frame units.

16. The image data compression device as defined in claim 12, comprising:
a hardware processing section which processes moving image data by hardware; and
a software processing section which generates the encoded data by encoding the quantized data read from the FIFO buffer section by software,
wherein the hardware processing section includes the quantization section and the FIFO buffer section; and
wherein the software processing section includes the encoded data generation section and the rate control section.

17. The image data compression device as defined in claim 16,
wherein the hardware processing section outputs a difference between input image data in a current frame and previous image data in a frame immediately before the current frame as motion vector information;
wherein the hardware processing section performs a discrete cosine transform of the motion vector information and outputs resulting information as image data to the quantization section; and wherein the hardware processing section generates the previous image data based on inverse-quantized data obtained by inverse-quantizing the quantized data by using the quantization step.

18. The image data compression device as defined in claim 17,
wherein the software processing section encodes the quantized data read from the FIFO buffer section into a variable length code.

19. The image data compression device as defined in claim 18,
wherein the software processing section performs scan processing in which the quantized data read from the FIFO buffer section is rearranged, and encodes a result of the scan processing into a variable length code.

20. The image data compression device as defined in claim 19,
wherein the software processing section calculates a DC component and an AC component from the quantized data read from the FIFO buffer section, performs scan processing in which the DC component and the AC component are rearranged, and encodes a result of the scan processing into a variable length code.

21. An encoder which performs compression processing for image data, the encoder comprising:
an image input interface which performs interface processing for inputting image data;
a quantization section which quantizes image data in frame units;
a FIFO buffer section which buffers quantized data for at least N frames (N is an integer greater than one) from the quantization section; and
a host interface which performs interface processing for a host which reads the quantized data stored in the FIFO buffer section asynchronously from writing into the FIFO buffer section,
wherein the host calculates a quantization parameter to be equal to or less than an upper threshold of the quantization parameter or to be equal to or greater than a lower threshold of the quantization parameter by using an average data size obtained by averaging the data size of the encoded data for N frames preceding a frame of image data to be quantized by the quantization section; and
wherein the quantization section quantizes image data by using a quantization step which is based on the quantization parameter.

22. The encoder as defined in claim 21,
wherein, when the quantized data read from the FIFO buffer section is data of an intra-frame-coded macroblock which is encoded within one frame, the host calculates the data size of the encoded data as the average data size; and
wherein the quantization section quantizes image data by using the quantization step.

23. The encoder as defined in claim 21,
wherein the host calculates the quantization parameter to be equal to or less than the upper threshold and equal to or greater than the lower threshold, by using the average data size.

24. An encoder which performs compression processing for image data, the encoder comprising:
an image input interface which performs interface processing for inputting image data;
a quantization section which quantizes image data in frame units;
a FIFO buffer section which buffers quantized data for a plurality of frames from the quantization section; and
a host interface which performs interface processing for a host which reads the quantized data stored in the FIFO buffer section asynchronously from writing into the FIFO buffer section,
wherein the host calculates a quantization parameter to be equal to or less than an upper threshold of the quantization parameter or to be equal to or greater than a lower threshold of the quantization parameter; and
wherein the quantization section quantizes image data by using a quantization step which is based on the quantization parameter.

25. The encoder as defined in claim 24,
wherein the host calculates the quantization parameter to be equal to or less than the upper threshold and equal to or greater than the lower threshold.

* * * * *